July 5, 1960 T. V. McNAMARA ET AL 2,943,719
CHANGE GEAR SYSTEM
Filed Feb. 10, 1958 11 Sheets-Sheet 2
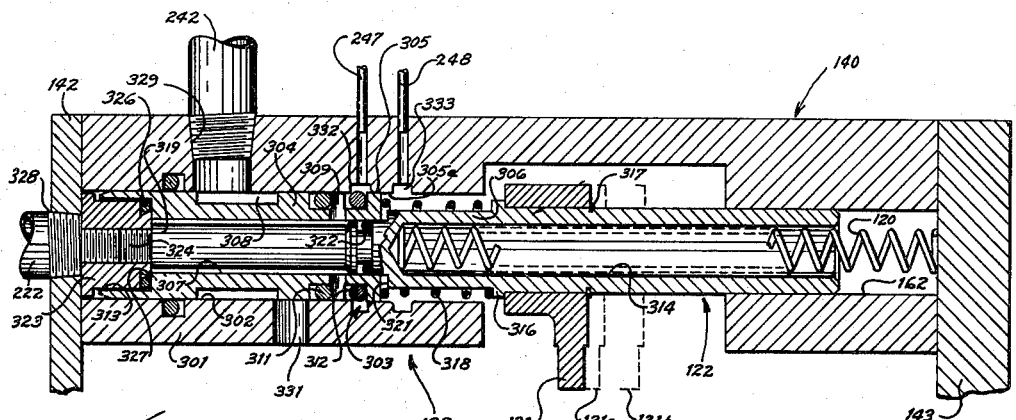
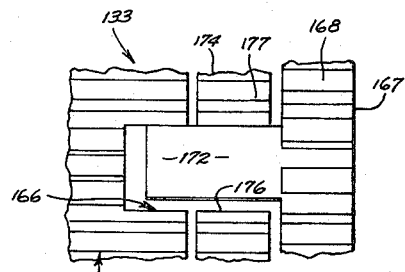
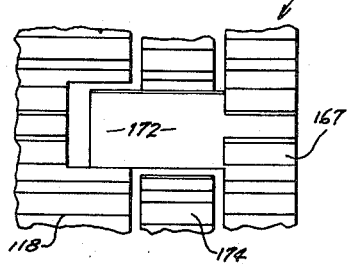
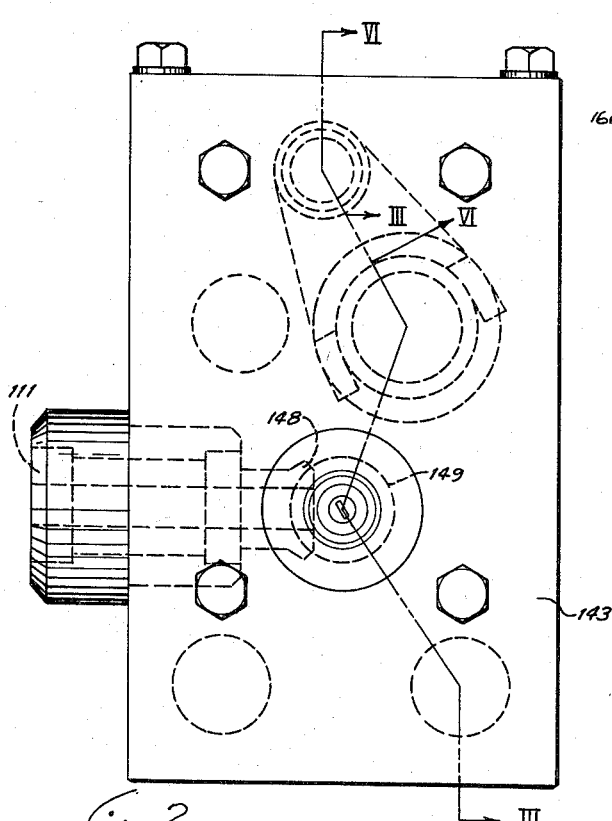
INVENTORS
CHARLES M. PERKINS
THOMAS V. McNAMARA
BY
Woodhams, Blanchard and Flynn
ATTORNEYS INVENTORS
CHARLES M. PERKINS
THOMAS V. McNAMARA INVENTORS
CHARLES M. PERKINS
THOMAS V. McNAMARA
BY
Woodhams, Blanchard and Flynn
ATTORNEYS July 5, 1960

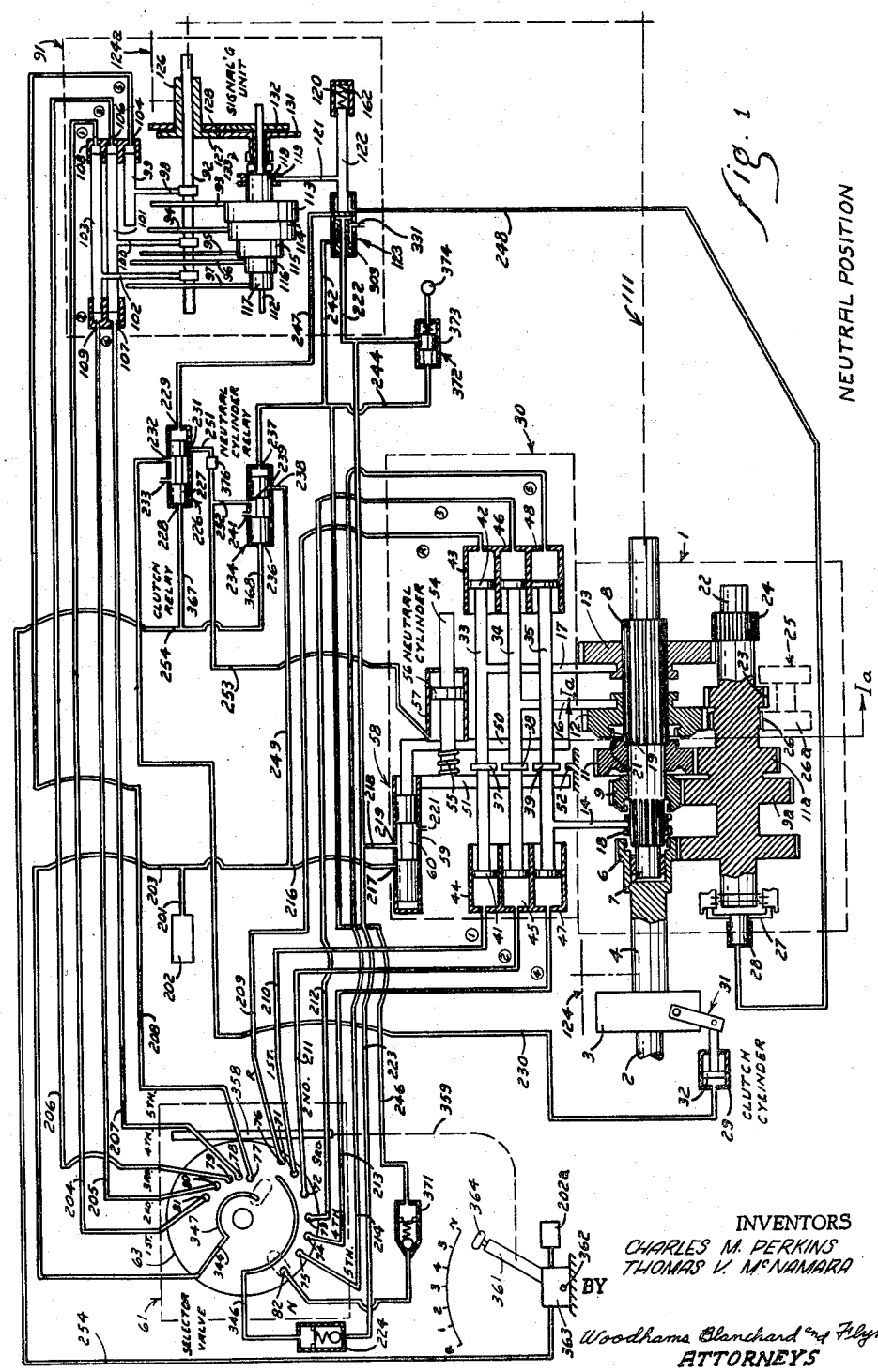

T. V. McNAMARA ET AL 2,943,719

CHANGE GEAR SYSTEM

Filed Feb. 10, 1958

INVENTORS
CHARLES M. PERKINS
THOMAS V. McNAMARA
BY
Woodhams Blanchard and Flynn
ATTORNEYS

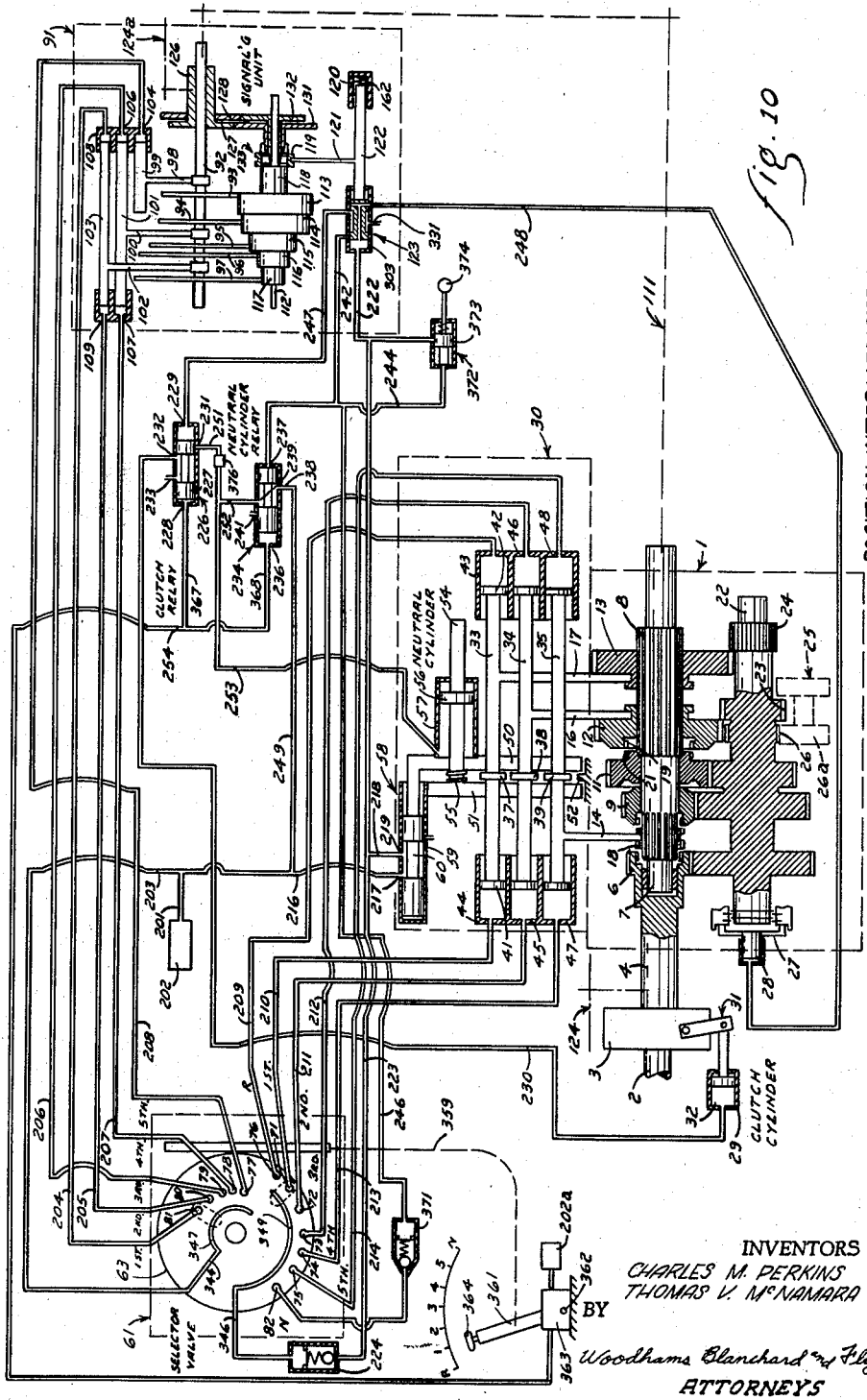

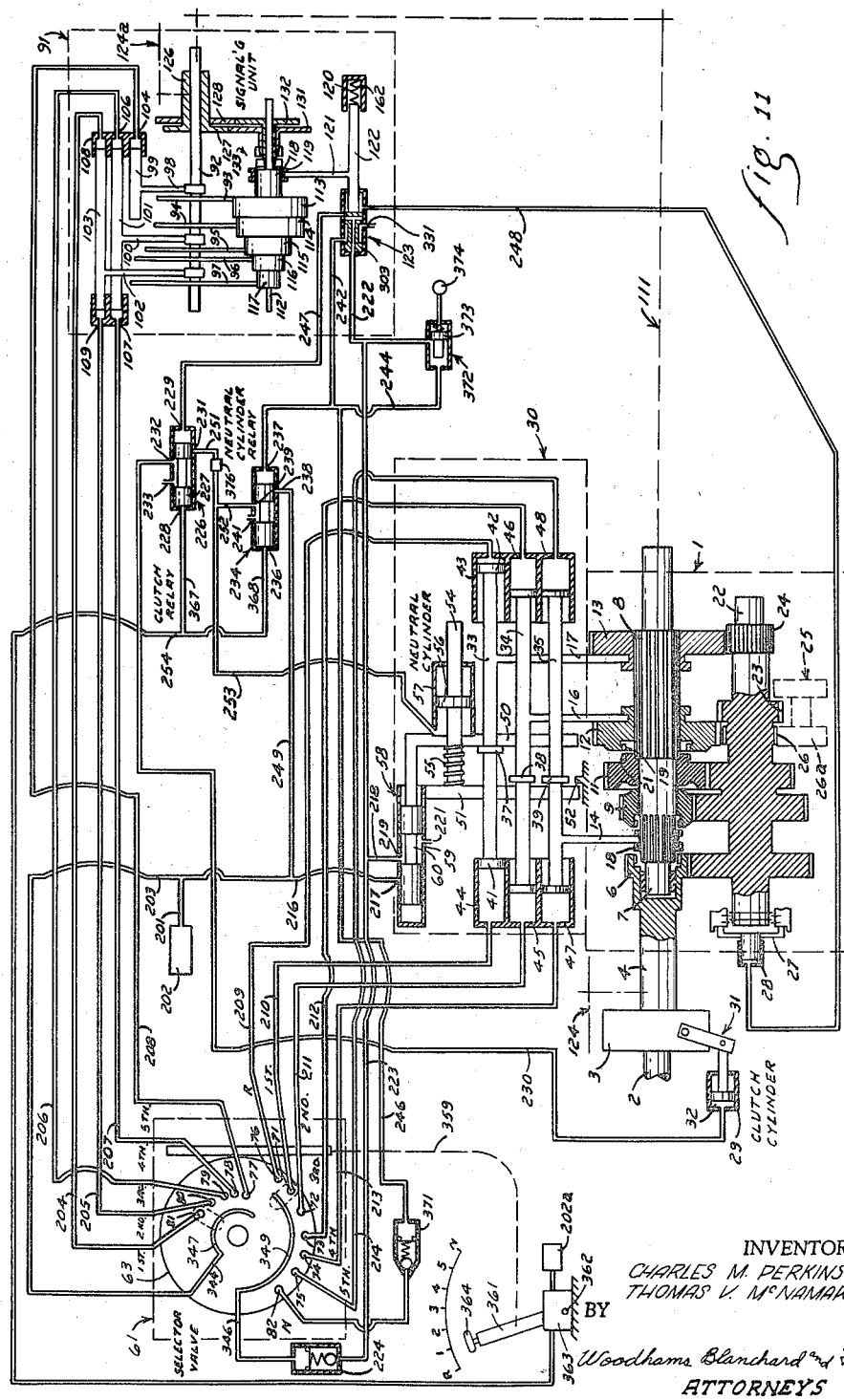

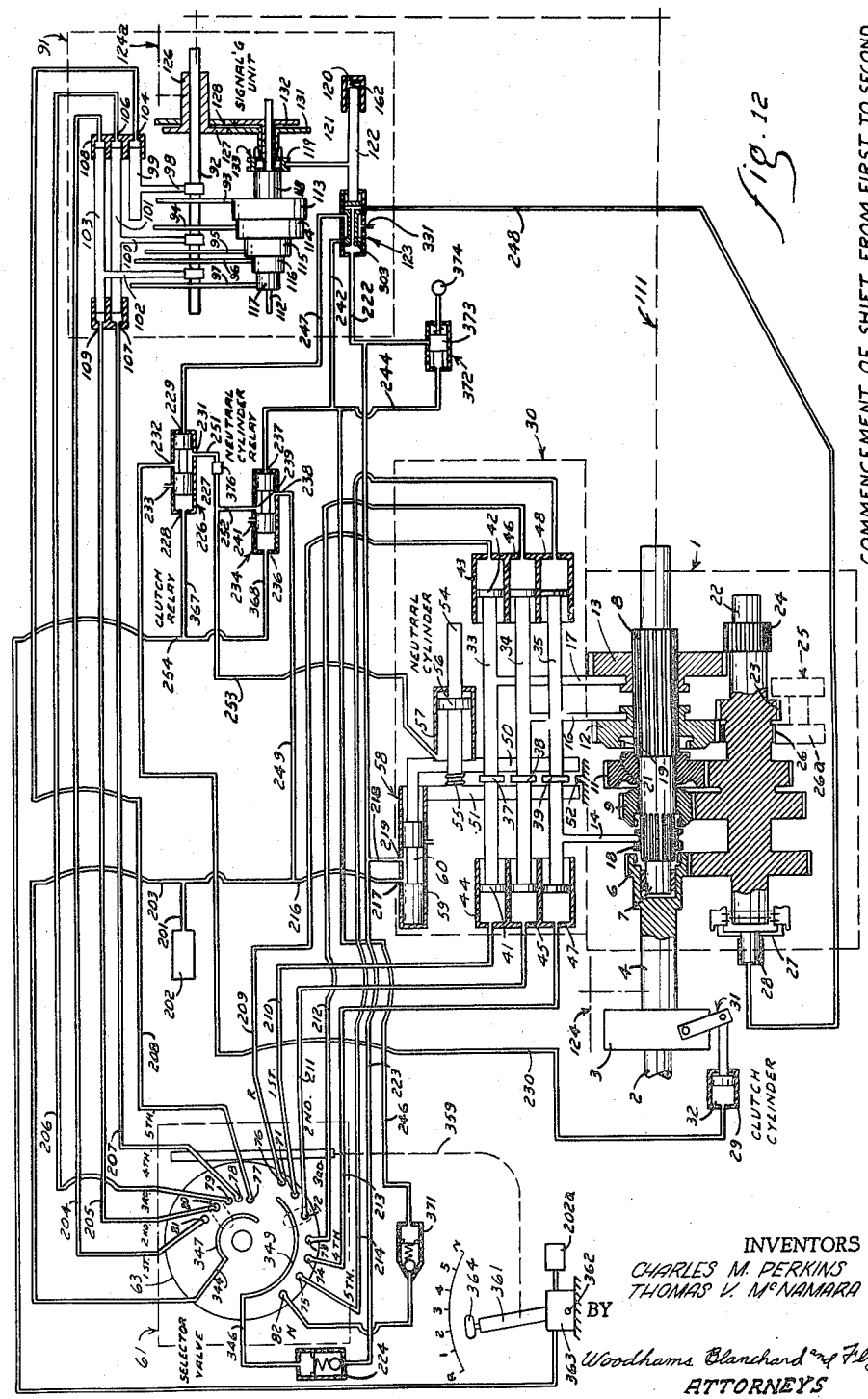

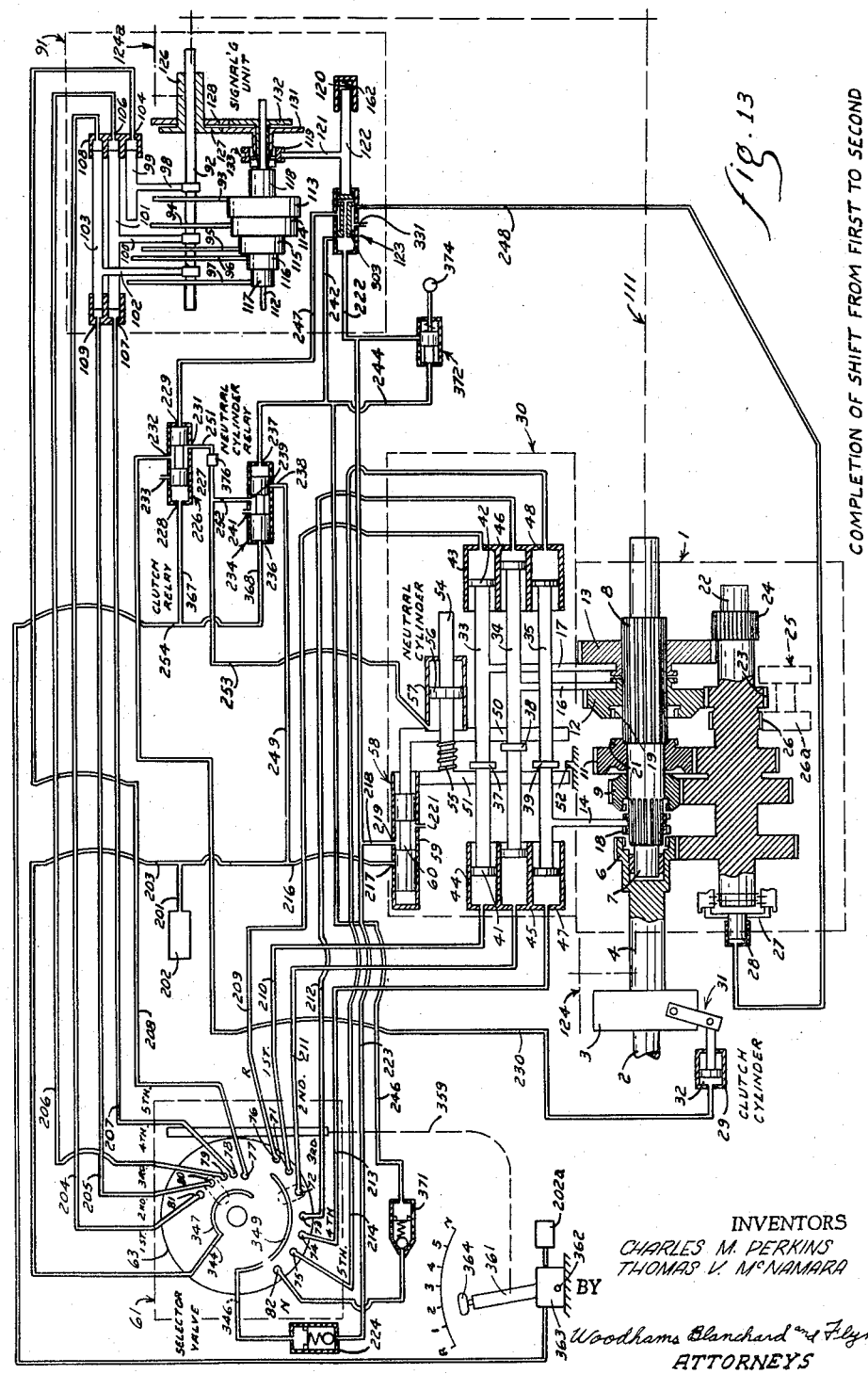

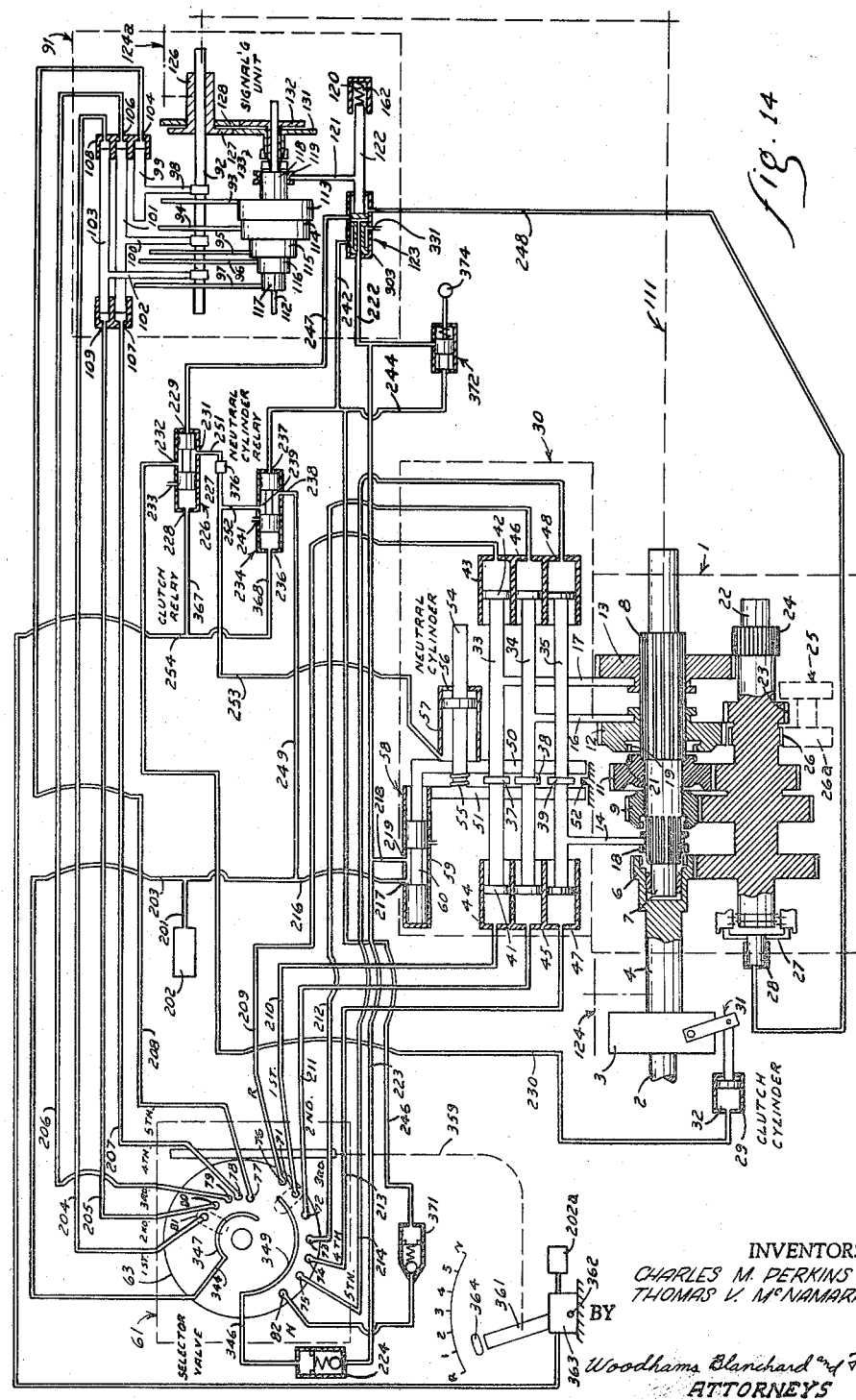

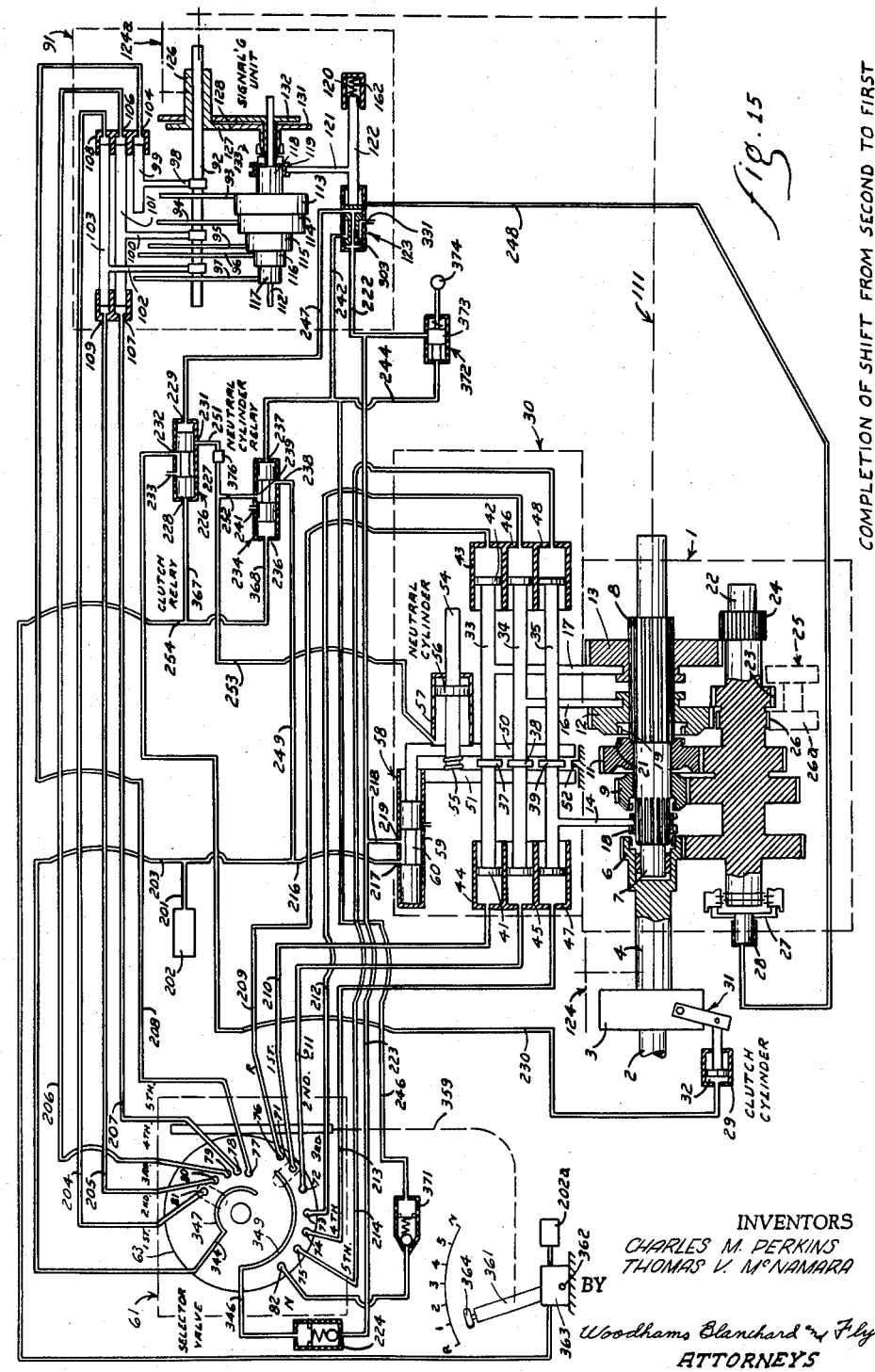

United States Patent Office 2,943,719
Patented July 5, 1960

2,943,719

CHANGE GEAR SYSTEM

Thomas V. McNamara, Cooper Township, Kalamazoo County, and Charles M. Perkins, Oshtemo Township, Kalamazoo County, Mich., assignors, by mesne assignments, to Fuller Manufacturing Company, a corporation of Delaware Filed Feb. 10, 1958, Ser. No. 714,191

24 Claims. (Cl. 192—3.5)

This invention relates to control mechanism for a change gear system and particularly to control mechanism providing, upon manual selection and initiation, an extremely rapid and accurately synchronized power shifting operation in response to the attainment by the change gear system of a predetermined condition of relative speeds by the parts to be next engaged.

It has long been recognized that the ideal condition for shifting the gear ratios in a change gear system involves (a) holding to a minimum the period of time during which the flow of power through the gear system is interrupted together with (b) effecting the shifting of the gears with a minimum of interference between the toothed elements which are in the process of being engaged. Further, while minimizing such interference and consequent clashing of such toothed elements is, of course, desirable in itself, it also assists materially in minimizing the time required to effect the shift.

Shifting operations have long been carried out by apparatus for effecting the shift as rapidly as possible after the attainment by said toothed elements of a predetermined relative speed relationship. Normally, in conventional apparatus, this speed relationship is equality of circumferential speed between the sets of toothed elements to be engaged and at the pitch diameters thereof, and the condition which signals the engagement of the toothed elements is attainment by said gears of such equality. Where gears are changing relative speeds with respect to each other at a high rate of acceleration or deceleration, the use of a signal, which occurs at the point when said relative speeds are equal, necessarily results, due to the inevitable time lag between the occurrence of the signal and the actual movement of the parts actuated thereby, in attempting to engage said gears while said relative speeds are changing away from equality.

In recognition of this, we have previously devised apparatus by which the shift signal is caused to occur at a point slightly ahead of the condition of equality above mentioned and thereby effect the actual inter-engagement of the toothed elements being engaged at, or very close to, the point of actual equality of circumferential speeds at the pitch diameter. A method and apparatus for this purpose is presented in our application entitled: "Apparatus and Method for the Synchronizing and Shifting of Rotating Shiftable Toothed Elements," Serial No. 569,-503, filed March 5, 1956.

However, in furthering a constant effort to improve this method and apparatus, it has been observed that in the apparatus of said application, though in general it is highly successful, there is a possibility for improper signaling of an upshift or a downshift as a result of error by the operator in manipulating the control element.

Accordingly, it is desirable to provide an improved method and mechanism, within a system of the general character set forth in the above identified application, by which the desired signal to the synchronizing mechanism is positive and accurate in each instnace and is not dependent in any respect upon the driver of the vehicle.

Further, in the apparatus of the above identified application, there was required a number of separate blocking devices in the synchronizing signaling mechanism and there was also required a large number of conduit connections. It being desirable for obvious reasons to reduce both of these groups of items, and other parts, to the minimum possible number, and yet to do so without interferring with the proper functions of the control mechanism, further effort has been expended in this direction.

While it is essential, for reasons which are well understood, to minimize the time during which the flow of power through the transmission of a road vehicle is interrupted by and during a shifting operation, it becomes even more important where the transmission is used in connection with earth moving equipment. Here, the equipment is not only operating at low speeds but also under extremely high load conditions. Thus, the ability of the vehicle's inertia to continue rotation of the parts which are about to be engaged while the flow of power through the transmission is interrupted is even less than it is in the case of road vehicles. Accordingly, the necessity of an extremely rapid shift mechanism for this type of vehicle has long existed but has never previously, to our knowledge, been satisfactorily answered with respect to positively interengaged toothed elements.

Accordingly, the objects of the invention have been:

(1) To provide transmission control mechanism capable of effecting an extremely rapid shift of the gear ratios between positively interengaged toothed elements.

(2) To provide control mechanism for change speed gearing indicating the approach of synchronization between selected pairs of toothed elements at a preselected period of time ahead of the actual instant of synchronization.

(3) To provide control mechanism for change speed gearing indicating the approach of synchronization between selected pairs or gears at a preselected period of time ahead of the actual instant of synchronization and to do so as a function of the mechanism itself and thereby avoid possible errors in the operation of the mechanism due to erroneous control by the driver of the vehicle.

(4) To provide control mechanism for change speed gearing, as aforesaid, in which the approach to synchronization between selected pairs of toothed elements will be properly signaled regardless of whether said approach is from an upshift or from a downshift direction.

(5) To provide control mechanism for change speed gearing, as aforesaid, utilizing a pressure fluid for effecting the actual gear shifting operation.

(6) To provide control mechanism for change speed gearing, as aforesaid, wherein both the pressure fluid requirements and the likelihood of leakage thereof through improperly made, or worn, connections is reduced to a minimum.

(7) To provide control mechanism for change speed gearing, as aforesaid, wherein the source of the pressure fluid is connected to the shifting apparatus for effecting the actual shifting movement of the parts thereof at the beginning of a shifting operation, but which is disconnected therefrom substantially as shifting movement commences and remains so disconnected while the toothed elements are in fully shifted position, except for reconnection occurring in connection with a subsequent shifting operation.

(8) To provide control mechanism for change speed gearing, as aforesaid, in which the signaling, or "brain," unit is materially simplified over previously known units and particularly wherein such signaling unit itself utilizes only a single synchronization indicating device.

(9) To provide control mechanism for change speed gearing, as aforesaid, in which the conduits and valving required are materially simplified over previously known units.

(10) To provide control mechanism for change speed gearing, as aforesaid, which can be maintained in good operating condition by ordinary maintenance personnel using ordinary tools.

(11) To provide control mechanism for change speed gearing, as aforesaid, in which the component parts of the control mechanism can be effectively provided in readily separable units, which units can be easily assembled into a control system and which units can be readily caused to operate with an otherwise fully standard transmission assembly.

Other objects and purposes of the invention will be apparent to persons acquainted with devices of this general type upon a reading of the following description and inspection of the accompanying drawings.

In the drawings:

Figure 1 is a schematic representation of apparatus embodying the invention with the transmission in neutral position.

Figure 2 is an end elevation of the signaling device.

Figure 6 is a longitudinal section taken on the line VI—VI of Figure 2.

Figure 7 is a fragmentary showing of a portion of the synchronizing mechanism in one position of operation.

Figure 8 is a fragmentary portion of the same mechanism shown in Figure 7 in another position of operation.

Figure 9 is a schematic illustration similar to Figure 1 showing the mechanism at the beginning of a shift operation from neutral into first gear.

Figure 10 is a schematic illustration of the mechanism illustrating the next step in a shifting operation from neutral into first gear.

Figure 11 is a schematic illustration similar to Figure 1 showing the mechanism in the position occupied at the completion of a shift from neutral to first gear.

Figure 12 is a schematic illustration similar to Figure 1 showing the parts at the commencement of a first into second gear.

Figure 13 is a schematic illustration similar to Figure 1 showing the parts at the completion of a shift into second gear.

Figure 14 is a schematic illustration similar to Figure 1 showing the parts at the commencement of a down shift from second gear into first gear.

Figure 15 is a schematic illustration similar to that of Figure 1 showing the position of the parts at the completion of a downshift from second gear into first gear.

GENERAL DESCRIPTION

Figure 3:
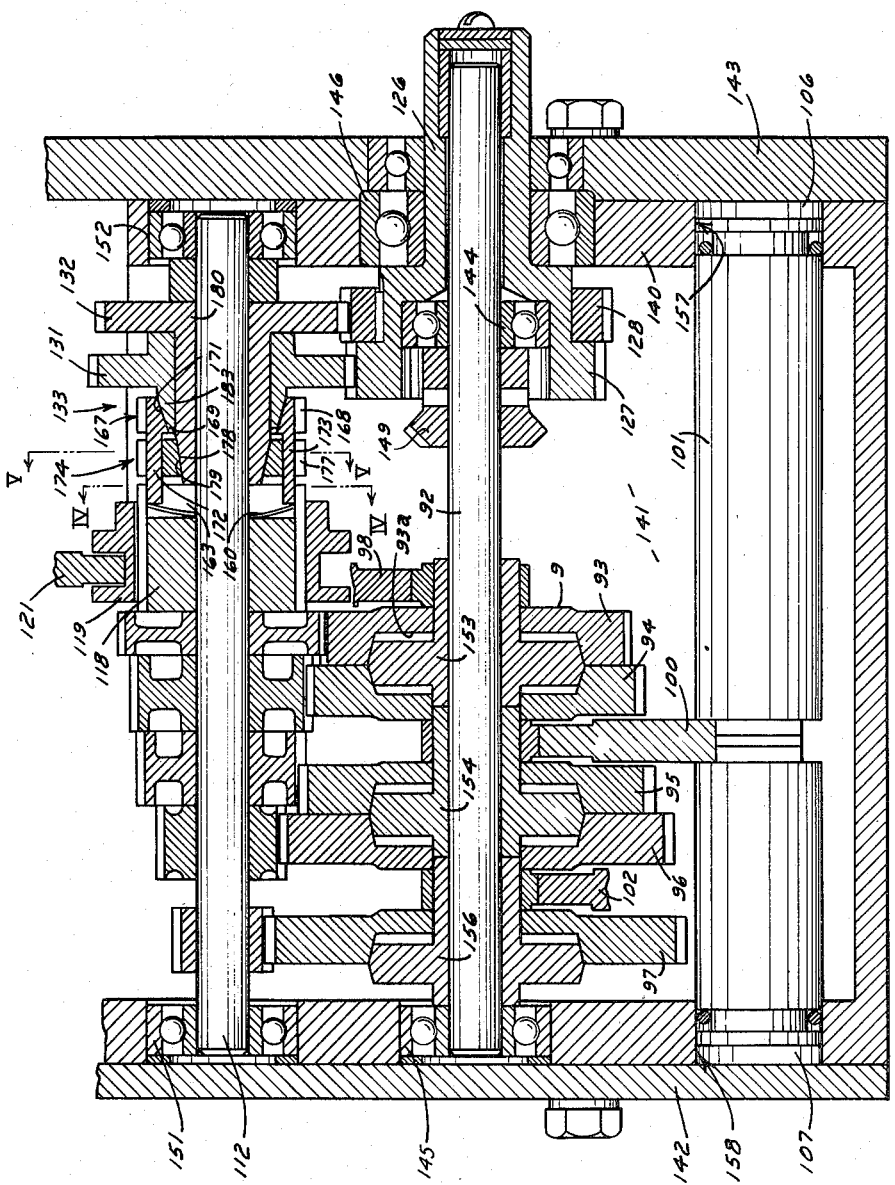
Figure 3 is a section taken on the line III—III of Figure 2.

In general, the apparatus of the invention consists of a plurality of power devices, usually pressure fluid cylinders, adapted for shifting a change gear system, there being one said power device for each shifted position of said transmission from its neutral position and there being a further power device for restoring said transmission to its neutral position. A selector valve is provided by which the operator manually selects the gear ratio into which the apparatus is to be shifted. A signaling unit is provided with two sets of gears which sets are provided on a small scale with gear ratios generally similar to the ratios in the transmission to be controlled. One of said sets of gears is driven from, or at a constant speed ratio with respect to, the input shaft of the transmission being controlled and the other set of said gears is driven from, or at a constant speed ratio with respect to, the output shaft of said transmission. Said sets of gears are further connected to each other through a pair of direction sensing gears and a blocker system which latter permits movement of a signal member when the rest of the signaling device indicates a predetermined condition of relative speeds in the transmission being controlled. The predetermined condition of relative speeds here utilized is that which occurs while the gears about to be engaged are approaching synchronization and the control mechanism will correctly so indicate regardless of whether the approach is from an upshift or downshift direction.

An initiating device is provided by which the operator initiates operation of the mechanism, after previous selection of the shift to be made thereby. After such initiation of said mechanism, the automatic functioning proceeds to completion of the shift without further possibility of control from, or interference by, the operator other than the usual and necessary acceleration of the engine in a downshift. Parts immediately responsive to said initiating device respond to actuation thereof to move the transmission into neutral position. Parts responsive to the signaling unit, upon the appearance of a signal indicating that the gears of the transmission to be engaged have reached a selected condition approaching synchronism with each other, function to move the transmission parts from their neutral position into the next shifted position.

The invention also involves a simplified valving arrangement in association with the signaling unit, and the entire system involves certain simplifications as compared to the above identified previous application for the purpose of generally improving the operation of the apparatus and decreasing its cost.

DETAILED DESCRIPTION

General organization

In describing in detail the apparatus comprising the illustrated form of the invention, free use will for convenience be made of such terms as "inward" and "outward," and derivatives thereof, "rightward" and "leftward," and derivatives thereof, "upward" and "downward," and derivatives thereof, "horizontal" and "vertical," and derivatives thereof, and various other terms implying direction or position. Such terminology as "inward" and "outward" and its derivatives will refer to directions toward or away from the geometric center of the apparatus at any given time under discussion; terms such as "leftward" and "rightward" and their derivatives will refer to directions as appearing in the drawings; and such terms as "upward" or "downward," "horizontal" or "vertical" and their derivatives will refer to the apparatus in its normal condition or position of operation. It will be recognized that all of these terms are used for convenience in reference only and none of them shall be taken to import any limitations in the design or use of the apparatus and particularly such terms as "horizontal," "vertical," "upward" or "downward" shall not preclude the use of the transmission here illustrated, or other apparatus embodying the present invention, in other convenient or desirable operating positions.

Figure 1A:
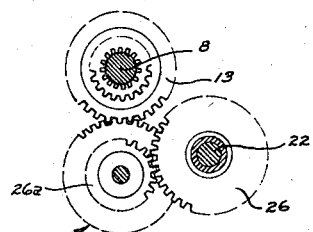
Figure 1a is a section taken on the line Ia in Figure 1.

Referring to Figure 1 there is indicated generally at 1 a transmission of standard construction, such as the construction shown in United States Patent No. 2,538,653. Although the details of such a transmission construction are fully given in said patent, they will be summarized briefly here for purposes of convenient reference.

An output shaft 2 from a source of power (not shown) is connected to a conventional clutch 3 whose output drives the input shaft 4 of the transmission 1. Said input shaft 4 is connected to an input gear 6 which gear is counterbored and provided with a suitable bearing for supporting the leftward end 7 of the transmission main shaft 8. Said transmission main shaft is provided with usual ratio gears 9, 11, 12 and 13, said gears 9 and 11 being rotatably mounted on said shaft and the gears 12 and 13, in this particular embodiment, being splined thereto. Conventional yokes 14, 16 and 17 are provided for selectively connecting certain of said gears to the main shaft 8. The yoke 14 operates a jaw clutch structure 18 which is slidably splined onto the main shaft 8 and alternately cooperates with the gears 6 and 9. The yoke 16 acts through the gear 12, on which is provided a jaw clutch means 19 which cooperates with similar jaw clutch means 21 on the gear 11 for connecting same to the main shaft 8.

The countershaft 22 (Figure 1) has the usual series of countershaft gears fixed thereto for constant rotation therewith, and said countershaft gears are in this embodiment and the usual manner, in constant engagement with the gears 6, 9 and 11. The gears 12 and 13 on the main shaft are caused, by their respectively connected yokes, to slide axially to engage the gears 23 and 24, respectively, on the countershaft. The reverse driving gear 26 on said countershaft 22 is continuously engaged by the gear 26a of the reverse gearing 25, which is connectable in a conventional manner by the gear 13 to the main shaft 8 for rotating in the reverse direction. A conventional countershaft brake 27 (Figure 1) is operative for engagement or disengagement in response to pressure in a countershaft brake cylinder 28.

A clutch cylinder 29 is connected by suitable linkage 31 to the clutch 3 for disengaging same upon appearance of pressure in the chamber 32. The clutch is re-engaged by a conventional spring (not shown) within the clutch mechanism 3.

The transmission actuating section 30 includes the shift rods 33, 34 and 35 which are mounted in any convenient manner and connected respectively for actuating the yokes 14, 16 and 17.

The shift rods 33, 34 and 35 are supported in any convenient manner for axial movement relative to the shafts 4, 8 and 22, but the specific means of support are omitted from the drawing to avoid unnecessary complication thereof.

Each of said shift rods has a stop member positioned intermediate its ends, stop 37 being on shift rod 33, stop 38 being on shift rod 34 and stop 39 being on shift rod 35. Suitable pistons, such as the pistons 41 and 42 are located at the opposite ends of the shift rod 33, are provided on the opposite ends of each of said shift rods. Each of said pistons is located within a suitable shift cylinder, such as the cylinders 43 and 44, 45 and 46, and 47 and 48 associated with the shift rods 33, 34 and 35, respectively. Thus, pressure appearing in any selected one of said shift cylinders will constitute a shift energizing force urging the shift rod associated with said selected cylinders in a shifting direction.

A pair of neutralizing plates 50 and 51 are provided with openings through which the several shift rods extend. The plates are arranged on opposite sides of the stops 37, 38 and 39 and are slidable with respect to the shift rods toward and away from said stops. A fixed stop 52 is schematically indicated in Figure 1 as fastened to the frame of the apparatus for limiting the motion of plates 50 and 51. When said plates 50 and 51 are snugly adjacent to the opposite sides of said fixed stop 52, the several shift rods are in their respective neutral positions.

The plate 51 carries a rod 54 on which is mounted the neutral piston 56, which is slidably arranged within the neutral cylinder 57. The plate 50 is affixed to the walls of the neutral cylinder 57. Thus, pressure fluid introduced into the leftward end of the neutral cylinder 57 will urge the cylinder leftwardly and the piston 56 rightwardly, which causes the plate 50 to move leftwardly and the plate 51 to move rightwardly until they both contact the stop 52. This effects a movement of all of the shift rods into their respective neutral positions. Means, such as the spring 55, is provided between the plates 50 and 51 to urge them apart for reasons appearing hereinafter.

A neutral valve 58 includes a cylinder 59 which is connected to, and moves with, the plate 51. Valve 58 also includes a sliding spool 60 which is connected to, and moves with, the neutral cylinder 57. Thus, movement of the neutral piston 56 with respect to the neutral cylinder 57 will also effect relative movement between the piston and cylinder of the valve 58. The functions of the neutral valve 58 will appear hereinafter.

*The selector valve*

The valve 61 (Figures 1, 16 and 17) may be constructed in any of many known forms and the specific form hereinafter described is presented for illustrative purposes only and constitutes by itself no part of the invention.

Figure 16:
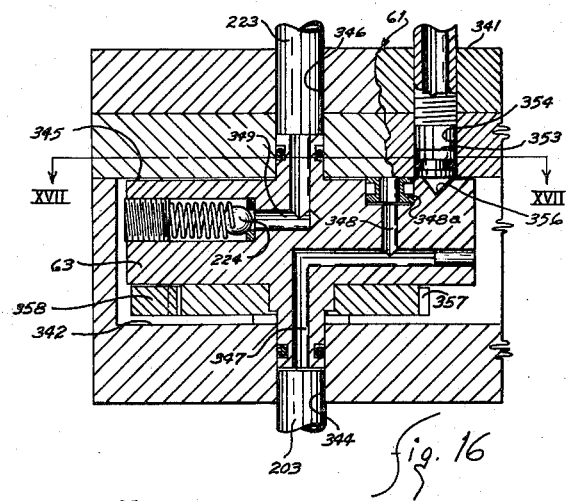
Figure 16 is a central sectional illustration of a typical selector valve used in the apparatus schematically illustrated in Figure 1.
Figure 17:
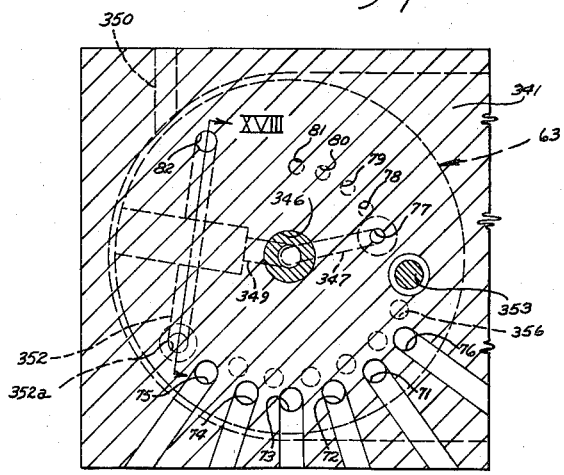
Figure 17 is a section taken on the line XVII—XVII of Figure 16.
Figure 18:
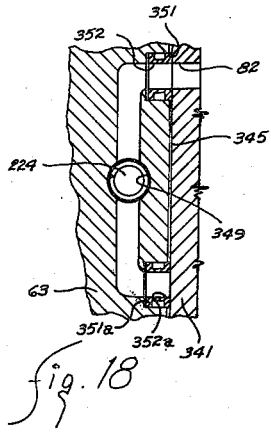
Figure 18 is a section taken on the line XVIII—XVIII of Figure 17.

The housing 341 (Figure 16) has an internal opening 342 containing a cylindrical valve core 63. Inlet openings 344 and 346 in the housing 341 are respectively connected to the lines 203 and 223 shown in Figure 1. The core 63 has a first internal passageway 347 which communicates between the inlet opening 344 and a first outlet port 348 (Fig. 16). As the core 63 is rotated about its axis, said port 348 is successively brought into communication with the several control outlet ports 77 through 81, inclusive (Figures 1 and 17). A second internal passageway 349 is provided in communication with the opening 346 and it is connected through a check valve 224 to a pair of second outlet ports 352 and 352a (Figure 18). As said core 63 is rotated, one of the ports 352 and 352a is successively brought into communication with the several cylinder outlet ports 71 through 76, inclusive, and 82. The several cylinder ports and control ports are arranged with respect to each other and with respect to the said core so that, as indicated in Figure 1, the first gear cylinder port 71 is connected by passageway 349 to its pressure source in line 223 at the same time that the first gear control port 81 is connected by passageway 347 to its pressure source in line 203. Likewise, the second gear cylinder port 72 is connected to its pressure source in line 223 at the same time that the second gear control port 80 is connected to its pressure source in the line 203, and successive cylinder ports and control ports are similarly paired in their respective connections to the source lines 223 and 203 through the rest of the shift sequence. Thus, the energization of each shift cylinder is accompanied by the energization of a predetermined one, and only one, of the control ports, and vice versa. However, it will be noted that there are no control ports corresponding to the cylinder port 82 for neutral position and the cylinder ports 76 for reverse position.

The detent plunger 353 in the housing 341 (Figure 16) is constantly urged by air applied through any convenient passageway 354 toward the core 63. Suitable depressions 356 (Figure 17) are arranged in said core to receive said detent 353 when the valve core 63 is in a position where said passageways 347 and 349 are connected to corresponding pairs of said control and cylinder ports, respectively.

The valve core ports 348, 352 and 352a (Figures 16 and 18) are provided with inserts 348a, 351 and 351a, respectively, which extend slightly out of the axial face 345 of the valve core 63 and thereby respectively connect the valve core ports 348, 352 and 352a with only a selected one of the cylinder ports 71 to 75 and a selected one of the control ports 77 to 81. The others of said cylinder and control outlet ports, which are not at any given time in register with one of said inserts, open into the internal opening 342. A further port 350 connects the internal opening 342 with the atmosphere, whereby each of the said ports 71 to 76 and 77 to 81, which are not at any given time in register with one of said inserts 352a and 348a, are open to the atmosphere.

Said valve core 63 may be rotated in any convenient manner, such as by providing its periphery with suitable teeth 357 (Figure 16), which engage the teeth of a similarly toothed rack 358 (Figures 1 and 16), which rack may be operated by the driver by any convenient manually (including pedally) actuated device, such as the control wire 359 (Figure 1).

The signaling device

The signaling device 91 (Figures 1, 2 and 3) is provided for giving a signal at the moment when the gears of the toothed elements of the main transmission, which are about to become engaged by a given shifting operation, have reached a selected condition preceding a state of synchronism. Said condition is based on the actual relative speeds of said toothed elements, and the signaling device is caused to give the desired signal when said relative speeds become sufficiently close to synchronism that, if the signal for the completion of the shifting operation is given at that moment, said gears will be in, or substantially in, exact synchronism at the moment when they start to engage each other. In this way, the shift is made rapidly and silently and with a minimum of wear on the interengageable toothed elements. The control mechanism is such that by its own inherent structure the signal will be given at the proper time regardless of whether the transmission is being operated in an upshift or a downshift sequence.

In general, and still with reference to Figure 1, said signaling unit 91 includes a first shaft 92 having a plurality of ratio gears 93, 94, 95, 96 and 97 supported thereon and arranged for rotation with respect thereto. A yoke 98 is provided in association with a shift rod 99 for connecting the gear 93 to the first shaft 92 in response to axial motion of said shift rod 99. A yoke 100 is arranged in association with a shift rod 101 for connecting one of the gears 94 and 95 to the first shaft 92 upon axial movement in one direction or the other of the shift rod 101. A third yoke 102 is arranged in association with a third shift rod 103 and is provided for connecting one of the gears 96 and 97 to the first shaft 92 upon movement of the third shift rod 103 axially in one direction or the other. A suitable signaling cylinder 104 is provided for axial actuation of the first shift rod 99. Similar signaling cylinders 106 and 107 are provided for axial actuation of the second shift rod 101 and other cylinders 108 and 109 are provided for axial actuation of the third shift rod 103. Connecting means indicated generally at 111 are provided for connecting one end, here the main shaft 8, of the main transmission 1 with the first signaling shaft 92.

A second signaling shaft 112 is supported rotatably parallel with the first signaling shaft 92 and is provided with gears 113, 114, 115, 116 and 117, which are fixed thereon, each of said gears being respectively in constant mesh with the gears 93 to 97. A splined drive member 118 is also fixed to said second shaft 112 and supports a slidable sleeve 119 in axially movable, non-rotative, relationship therewith. Said sleeve is rendered axially movable by the yoke 121 which is connected to a signal rod 122 which is in turn actuated by a signal valve structure 123 hereinafter described in more detail.

The other end, here the input shaft 4 (Figure 1) of the main transmission 1 is connected by connecting means, schematically indicated at 124 and 124a, to a sleeve 126 which is rotatable with respect to the housing of the signaling unit 91, and is here shown as mounted upon, and coaxial with, the first signaling shaft 92. A pair of coaxial gears 127 and 128, having slightly different pitch diameters, are secured upon, and rotatable with, the sleeve 126. Cooperating gears 131 and 132, which are in constant mesh with the gears 127 and 128, respectively, are arranged rotatably on, and with respect to, the shaft 112 and also arranged rotatably with respect to each other. Speed sensitive means 133 (Figure 3) is provided for cooperation with the sliding sleeve 119 for connecting one or the other of the gears 131 and 132 to the shaft 112.

In this embodiment, a suitable core body 140 (Figure 3) is provided with a central chamber 141 for holding the various operating parts of the device and has suitable end openings hereinafter mentioned in more detail for receiving the several shafts and defining the several cylinders hereinafter referred to. End plates 142 and 143 are provided at each end of the core block 140.

The first signal shaft 92 is supported at its leftward end by a bearing 145 mounted in core block 140, and at its rightward end by a bearing 144 supported within the hollow shaft 126 which is in turn supported within the core block 140 by a bearing 146. The shaft 92 is driven by the connecting means 111, which includes a pair of engaged, bevel gears 148 and 149 (Figure 2), the latter gear being mounted on, and for rotation with, the shaft 92. The connecting means 111 may also include a flexible cable, not shown in detail, which operably connects the bevel gear 148 to the output of the transmission 1. The second signal shaft 112 is mounted by the bearings 151 and 152 for rotation in the core block 140.

Each of the gears 93 to 97, inclusive, is in this embodiment provided with axial end recesses 93a to 97a, respectively. A drive member 153, which is secured upon the shaft 92 between the gears 93 and 94, extends into, and is frictionally engageable with the walls of, the opposing recesses 93a and 94a for effecting rotation of the gears 93 and 94 with the shaft 92. Drive members 154 and 156 are similarly secured upon the first signal shaft 92 for respective engagement with the gears 95 and 96, and the gear 97. The yokes 98, 100 and 102 are arranged adjacent to said gears, and when said yokes are moved axially of the shaft 92 they urge said gears against one of the driving members 153, 154 or 156 and thereby effect a driving by the shaft 92 of the gear so urged.

The relative sizes of the pairs of gears in the signaling unit 91 are such that the gears 97 and 117 are equal in ratio to the ratio of the first speed gears 13 and 24 in the main transmission, the gears 96 and 116 are equal in ratio to that of the second speed gears 12 and 23 in the main transmission, the gears 95 and 115 are equal in ratio to that of the third speed gears 11 and 11a in the main transmission, the gears 94 and 114 are equal in ratio to that of the fourth speed gears 9 and 9a in the main transmission, and the gears 93 and 113 are equal in ratio to the direct drive of the main transmission. The ratio of the gears 127 and 131 is such as to drive the gear 131, and the parts hereinafter mentioned in more detail as associated therewith, at a speed slightly slower than that of the sleeve 126. The ratio of the gears 128 and 132 is such as to drive said gear 132, and the parts hereinafter mentioned as associated therewith, at a rate slightly more rapid than that of the sleeve 126. Thus, on the pressurizing, for example, of the cylinder 45 for a shift into second gear, the line 205 will also be pressurized and the rod 103 in the signaling unit will be urged rightwardly to effect a connection between the gear 96 and the shaft 92. Thus, with the shaft 92 being driven at a speed equal to that of the output shaft 8 of the main transmission, the shaft 112 of the signaling unit will be driven at a speed equal to that at which the countershaft 22 of the main transmission will be driven when the shift into second gear is completed. With the sleeve 126 connected to the input shaft 4 of the main transmission, the gear 132 will be driven at a speed slightly greater than the actual speed of said input shaft 4, and the gear 131 will be driven at a rotative speed slightly less than the actual speed of said input shaft 4. In this way, the speed sensitive means 133 will, as hereinafter detailed more completely, be caused to signal the synchronization of the speed of the shaft 112 with a speed slightly greater, or slightly less, than the speed of the input shaft 4, depending upon whether the point of synchronization is approached from an upshift or a downshift direction, that is, whether, prior to the attainment of synchronization by the main transmission, but after the shifting of the gears in the signaling unit, the gears 131 and 132 are rotating at a speed greater or less than the speed of the shaft 112.

The opposite ends of each of the shift rods 99, 101 and 103 are received within suitable cylindrical recesses in the core block 140, said recesses being illustrated in Figure 3 by the recesses 157 and 158 provided for the reception of the rod 101. The shift rods, as shown by the rod 101, are arranged in said recesses so that pressure fluid chambers are provided at each end thereof to constitute the several signaling cylinders above mentioned, here the cylinders 106 and 107. Thus, pressure fluid introduced into the pressure chamber 157 will urge the shift rod 101 in a leftward direction and pressure fluid introduced into the chamber 158 will urge the shift rod 101 in a rightward direction. The other signaling cylinders are similarly provided.

The signal control rod 122 (Figure 6) is slidably mounted at one end in a suitable opening 162 in the core block 140. The valve structure 123, which supports the other end of said rod 122, may take any of several forms. The one here specifically illustrated includes a housing structure 301 which is preferably arranged fixedly with respect to the side plates 142 and 143 of the housing 140 and may, as shown in Figure 2, be advantageously arranged as an integral part thereof. A central opening 302, which extends through the housing 301 and communicates with the opening 162, contains the valve core 303 therewithin. Said valve core comprises a trip portion 304 and a yoke portion 306.

The trip portion 304 (Figure 6) comprises a spool having a central opening 307 therethrough and a wide, circumferential groove 308 arranged therearound between its ends. An orifice 309 extends radially from the central opening 307 through the periphery of said spool at a point between said groove 308 and the rightward end of said spool. Suitable sealing means, such as the O-rings 311 and 312 encircle said spool on opposite sides of said orifice 309. Said spool is counterbored at 313 for reasons appearing hereinafter. The auxiliary or yoke portion 306 of said valve core has an internal opening 314 therein for the reception of a spring 120. The yoke 121 is arranged around said auxiliary portion and is held in place between one side of an annular flange 316, which is integral with said portion 306, and suitable removable fastening means, such as a snap ring 317. The spring 318 is arranged between the other side of the flange 316 and the rightward end of the trip portion 304.

Extending leftwardly from the yoke or auxiliary portion 306 (Figure 6) and preferably as an integral extension therefrom, is the trip core 319, which is of reduced diameter to provide a shoulder 321 for the purpose of limiting the rightward movement of the trip portion 304 relative to the auxiliary portion 306. Sealing means, such as the O-ring 322 is provided around said extension 319 at a point which is always rightwardly of the orifice 309 for the purpose of preventing escape of pressure fluid through the rightward end of the central opening 307.

Received within the above mentioned counterbore 313 (Figure 6) is a piston head 323, which is solidly affixed to the extension 319 by any convenient removable means such as the threaded arrangement at 324. Said piston head has an annular notch around its rightward end for receiving suitable sealing means, here the O-ring 326, which bears against the rightward end 327 of the chamber provided by the counterbore 313 for purposes appearing hereinafter.

The line 222 (Figure 6) is received through a suitable opening 328 in the plate 142 at a point adjacent to the piston head 323. The line 242 is received into the housing 301 by a suitable opening at 329 which communicates with the central opening 302. An exhaust port 331 extends through the housing 301 and connects the central opening 302 to the atmosphere. Grooves 332 and 333 are arranged in the wall of the central opening 302 and connect respectively with the lines 247 and 248. Said grooves 332 and 333 become aligned with the orifice 309 in selected positions of the valve core 303 rightwardly from the position shown in Figure 6, as hereinafter discussed in more detail. An annular groove 308 in the trip core 304 connects the line 242 with the exhaust port 331 when the core 303 is in its leftward position, as shown in Figure 6. When the core is in its fully rightward position, with the rod 122 engaging the end plate 143, the groove 308 connects the line 247 to said exhaust port 331.

The speed sensitive structure 133 (Figure 3) constitutes a pair of serially arranged blocker members 167 and 174 cooperating with the gears 131 and 132. Said structure 133 is arranged for limiting at one of two predetermined points axial movement of the sleeve 119 in response to pressure applied to the valve core 303 (Figure 6) through line 222 and permitting such axial movement beyond said points only when certain speed relationships have been established between the shaft 112 and the shaft 92, and consequently between the input and output shafts of the main transmission.

Figure 4:
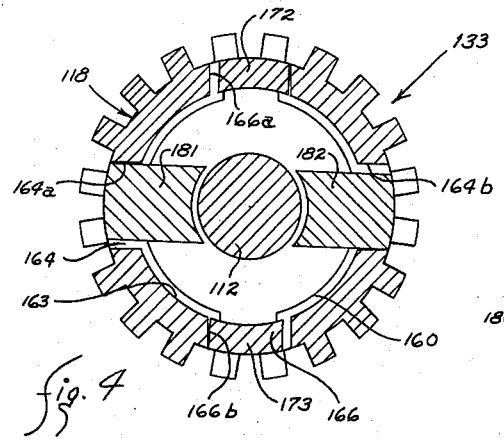
Figure 4 is a section taken on the line IV—IV of Figure 3.

A recess 163 is provided in the rightward end (Figure 3) of the splined member 118 and slots 164 and 166 (Figure 4) are provided extending diametrically across said rightward end of said member 118 to the same depth as the recess 163.

An upshift blocker 167 (Figures 3, 7 and 8) is provided with teeth 168 having the same shape and spacing as the splines on the member 118. Said blocker 167 has a tapered opening 169, the wall of which ride upon, and are frictionally engaged by, a similarly tapered surface 171 on the hub 183 (Figure 3) of the gear 131. Tongues 172 and 173 (Figures 3 and 4) extend from the body of the blocker 167 into the respective parts 166a and 166b of the slot 166. However, it will be noted that said tongues are narrower than said slot by a distance approximately equal to one-half the width of one tooth.

Figure 5:
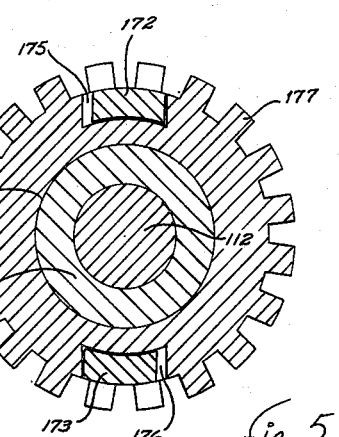
Figure 5 is a section taken on the line V—V of Figure 3.

A downshift blocker 174 is arranged between the upshift blocker 167 and the splined member 118 and has slots 175 and 176 (Figure 5), through which the tongues 172 and 173 can extend. Said blocker 174 is provided with teeth 177 similar in size and shape to the splines on the member 118 and it is provided with a tapered opening 178, the walls of which ride upon, and are frictionally engaged by, a similarly tapered surface 179 on the hub 180 of the gear 132. Extending leftwardly from the body of the blocker member 174 are suitable lugs 181 and 182 (Figure 4) which are received into the parts 164a and 164b, respectively, of the slot 164. The lugs 181 and 182 are each narrower than the respective slots into which they are received by a distance approximately equal to one-half the width of a spline on the splined member 118.

Resilient means, such as the leaf spring 160 is disposed between the axial end wall of the cavity 163 in the splined member 118 and the adjacent ends of the tongues 172 and 173, and the lugs 181 and 182. Thus, since the splined member 118 and hubs 180 and 183 are held against appreciable movement away from each other, the spring 160 urges the blocker members 167 and 174 into frictional engagement with their respective tapered surface 171 and 179.

*Pressure fluid connections*

A pressure supply line 201 (Figure 1) is connected from any convenient source 202 of suitable pressure fluid, here compressed air for illustrative purposes, and is thence connected by the line 203 to the supply port 344 of the valve 61.

Each of the control outlet ports 77 to 81 are then connected by a first group of lines, the lines 204 to 208, inclusive, to the several pressure chambers associated with the rods 99, 101 and 103 of the signaling unit 91. The line 204 connects the outlet port 81 to the pressure chamber 108; the line 205 connects the outlet port 80 to the pressure chamber 109; the line 206 connects the outlet port 79 to the pressure chamber 106; the line 207 connecting the outlet port 78 to the pressure chamber 107, and the line 208 connects the outlet port 77 with the pressure chamber 104.

A second group of lines 209 to 214, inclusive (Figure 1), connects the several cylinder outlet ports 71 through 76, inclusive, to the power cylinders actuating the shift rods of the transmission. The line 209 connects the reverse outlet port 76 to the reverse power cylinder 43, the line 210 connects the outlet port 71 to the first gear power cylinder 44, the line 211 connects the outlet port 72 to the second speed power cylinder 45, the line 212 connects the outlet port 73 to the third speed power cylinder 46, the line 213 connects the outlet port 74 to the fourth speed power cylinder 47 and the line 214 connects the outlet port 75 to the fifth speed power cylinder 48.

A further line 216 (Figure 1) connects the supply line 201 with the supply port 217 of the neutral cylinder valve 58 and a line 218 connects a second port 219 of the neutral cylinder valve to one end of the line 223. Said neutral valve 58 has an exhaust port 221 connectable with port 219 only when 219 is disconnected from 217 by the core 60. Said line 223 is also connected through the check valve 224 to the inlet or supply port 346 of the valve 61. Said line 218 is also connected by a line 222 to the leftward end of the valve 123. The line 222 is also connected to the manually operable, hand trip valve 372. Said check valve 224 is sensed to permit passage of pressure fluid through line 223 toward the valve 61 but to prevent such passage away therefrom.

A clutch relay valve 226 (Figure 1) is provided having a slidable core 227 therein, said core being urged by a pressure at its leftward pressure port 228 in a rightward direction and being urgable by pressure at its rightward pressure port 229 in a leftward direction. A first inlet port 232 is provided for connection by the core 227 to a second inlet port 231 or to an exhaust port 233. Said port 232 is connected by the line 230 to the clutch cylinder 29.

A neutral cylinder relay valve 234 is constructed generally similarly to the valve 226, the first and second pressure ports appearing at 236 and 237, respectively, its first and second inlet ports appearing at 238 and 239, respectively, and its exhaust port appearing at 241.

A line 242 (Figure 1) connects the supply port in the signal valve 123 to a line 244 which connects the hand trip valve 372 to the rightward pressure port 237 of the clutch relay 234. Said line 244 is further connected by the line 246 to the neutral control port 82 of the valve 61. A check valve 371 is placed in the line 246 for purposes appearing hereinafter and sensed to permit flow of pressure fluid away from the valve 61 but to prevent flow of pressure fluid through said line toward said valve. The first outlet groove 332 (Figure 6) of the signal valve 123 is connected by the line 247 to the rightward pressure port 229 of the clutch relay valve 226. The second outlet groove 333 of the valve 123 is connected by the line 248 to the pressure cylinder 28 of the countershaft brake 27 for actuating same upon the appearance of pressure in said line 248.

The supply 202 is also connected through the lines 201, 216 and 249 to the port 238 of the neutral relay 234. The ports 231 and 239 of the valves 226 and 234, respectively, are connected by lines 251 and 252, respectively, to a line 253 which is then connected to the port of the neutral cylinder 57. The pressure ports 228 and 236 of the valves 226 and 234, respectively, are connected to a pulse line 254 by the lines 367 and 368, respectively.

Said lines and connections may all be made in any conventional manner, although the system here disclosed is well adapted for embodiment in a series of cored plates which are then capable of rapid and accurate fabrication, assembly and effective and economic maintenance.

*The selector mechanism*

The selector mechanism (Figure 1) may take several of many specific forms, but is here for illustrative purposes shown as a lever 361 pivotally mounted at 362 on the frame of the vehicle. The wire 359 from the rack 358 is connected to said lever 361 in such a manner that actuation of said lever about its pivotal support will urge said rack to move longitudinally and thereby rotate the core of the valve 61. Conventional detent means (not shown) may be used to hold the lever 361 normally in whatever position it is placed by the operator.

Said selector is also provided with a pulse valve 363 which is operated by a suitable pulse control 364, in this case shown as a knob at the upper end of the lever 361. The pulse valve 363 is of any conventional form that will receive pressure fluid, such as compressed air, from a suitable source 202a (normally the same as the source 202) and admit a single brief pulse thereof into the pulse line 254. Such valves are well known and hence need no detailing.

The hand trip valve 372 is provided with a core 373 and a manually operating device, such as a knob 374. This valve is connected between the pressure line 222 and the relay control line 244 for purposes appearing hereinafter.

A restrictor 376 (Figure 1) is preferably placed in the line 231 and so sensed that it permits free flow of pressure fluid in a direction toward the clutch relay 226 but restricts the flow of fluid away from said relay. Thus, upon leftward movement of the core 227 of valve 234, the neutral cylinder 57 can discharge its fluid immediately through line 253 and exhaust port 241, but the fluid will be discharged from the clutch 29 more slowly through the valve 226 and restrictor 376, thus permitting the gear shifting mechanism to operate prior to the full reengagement of the clutch 3.

OPERATION

The operation of the control mechanism described above follows in general the operation of the mechanism described in the above identified application No. 569,503, but it differs from it in numerous details, particularly in the correct signaling of the synchronization for either an upshift or a downshift regardless of the manner of control by the driver.

*At rest condition*

Assuming first that the apparatus of the invention is installed in a road vehicle, such as a truck, and that the vehicle is at a standstill with the engine running, the following conditions will exist (Figure 9):

For holding the vehicle at a standstill, the valve core 63 (Figure 16) will be turned to the "N" position where communication will be established between the pressure line 223 and the neutral outlet port 82 (Figure 1) by the passageway 349 (Figure 16). The engine will be operating so that the engine output shaft 2 will be turning, but the transmission output shaft 8 will not be turning. The supply line 201 will supply pressure fluid from the source 202 through the line 203 to the passageway 347 in valve 61. However, since there is no neutral control outlet port in valve 61 corresponding to the cylinder port 82 therein, nothing responds to this pressure in line 203.

Pressure fluid also flows from line 201 through line 216 to the neutral valve 58. If for any reason there is pressure in the neutral cylinder 57 from a previous operation, pressure fluid from line 216 will flow through the valve 58, the line 223 and check valve 224 to the passageway 349. Such pressure fluid then flows from passageway 349 to port 82 and thence through check valve 371, line 246 and line 244 to the rightward side of the neutral cylinder relay 234 and moves the core therein leftwardly to the position shown in Figure 1. This exhausts any pressure in the line 252, the line 253 and the neutral cylinder 57 through the port 241. Accordingly, the spring 55 between the neutralizing plates 50 and 51 now urges the casing of the neutral cylinder 57 rightwardly and thereby urges the neutral valve spool 60 rightwardly. Such movement of the spool 60 connects the lines 218 and 222 to exhaust port 221 through the neutral valve 58 and thereby permits the signal valve core 303 to move leftwardly in response to urging by the spring 120, if it has not already done so.

Pressure is also exhausted from the clutch cylinder 29 (Figure 9) through the clutch line 230, the clutch relay valve 226 and its exhaust port 233, if the core 227 of valve 226 is in its leftward position. However, if the core 227 is in its rightward position, said clutch cylinder exhausts through the clutch relay 226 and the neutral cylinder relay 234 by way of the lines 230, 251, and 252. Thus, the clutch is engaged to effect rotation of the input shaft 4 and the countershaft 22, which situation is helpful when a truck is warming up in preparation for operation by agitating and thereby warming the oil in the transmission housing.

The first signaling shaft 92 (Figure 1) being connected to the output shaft 8 by connecting linkage 111, is stationary and the input sleeve 126, being connected to the input shaft 4, is rotating. There is, however, no pressure in the line 222 so that the spring 120 holds the valve core 122 leftwardly, as shown in Figure 6, and thereby holds the yoke 119 of the signaling unit leftwardly. Thus, the only pressure exerted within the blocking system 133 (Figure 3) is produced by the spring 160 between the drive member 118 and the blockers 167 and 174, which are thereby urged against the tapered blocking surfaces 171 and 179 respectively but only sufficiently to effect enough friction contact therebetween to initiate blocking action of said blockers.

There being no pressure on any of the control cylinders 104, 106, 107, 108 or 109, the gears 93 to 97, inclusive, will be free to rotate independently of the shaft 92 and with the gears 113 to 117, respectively, if and when the shaft 112, not stationary, is caused to rotate. Movement of the core 60 of the neutral valve 58 rightwardly, as stated above, exhausts the lines 218, 222 and 223 through the exhaust port 221 in the valve 58. Since the core 303 of valve 123 is in its leftward position (Figure 6), the lines 242, 246 and 244 can exhaust through port 331 in valve 123. This eliminates the pressure tending to hold the core of the neutral relay valve 234 in its leftward position, and places this valve in condition for actuation rightwardly upon the appearance of a pressure pulse in the pulse line 254. Similarly, the line 247 can exhaust past the faces 305 and 305a (Figure 6) and past the spring 318 into the chamber of the signalling device 91. Thus, pressure, if any, is relieved from the rightward end of valve 226 and said valve 226 is in a condition to be pulsed.

*Operation of signaling unit*

Before proceeding with a description of the operations involved in shifting the transmission into any of its several shifted positions, understanding of the invention will be facilitated by referring first to the operation of the signaling unit 91 by itself, after which the operation of the signaling unit will be integrated into the operation of the rest of the apparatus.

Assuming first that an upshift is desired, that sleeve 126 and shaft 92 are both rotating and that a selected one of the gears 93 to 97 is connected to shaft 92, the gears 131 and 132 will be each rotated at speeds differing from the speed of the sleeve 119 by a predetermined percentage. The ratios between the gears 131 and 132 with respect to the gears 127 and 128 are such that the gear 131 will rotate at a rate slightly slower than the sleeve 126 and the gear 132 will rotate at a rate slightly faster than that of the sleeve 126. Thus, the friction surface 179 (Figure 3) will tend to rotate more rapidly than the friction surface 171 with the following described effect on the blocker rings 174 and 167, respectively.

The spring 160 (Figure 3) urges the blocker rings 167 and 174 against their respective friction surfaces 171 and 179 sufficiently that even before the sleeve 119 starts to move axially toward the blocker rings, they act in response to the differential in speed between the gears 131 and 132 and the splined drive member 118. This results in a relative positioning of the blocker rings and the drive member 118 in the manner shown in Figure 7. Thus, the slider 119 can move axially and rightwardly along the middle blocking ring 174 until it is stopped by the second blocking ring 167. Such movement of the sleeve 119 will cause the yoke 121 (Figure 6) to assume the broken line position 121b whereby the orifice 309 will be aligned with the annular groove 333 and the line 248. Thus, pressure fluid can flow from line 222 through the valve 123 and the line 248 to apply the countershaft brake 27. As soon as the speed of the input shaft 4 is decreased to such a point that, taking into account the effective ratio between the shaft 92 and the shaft 112, the speed of the gear 131 goes past, or crosses, the speed of the drive member 118, then the blocker ring 167 will unblock in the usual manner so that the sleeve 119 can move on rightwardly into its full rightward position. Such movement will cause the core 122 to move rightwardly until it engages the plate 143 whereby the line 242 will be connected to the line 222 through the central opening 302.

In a downshift operation the speed of the shaft 112, hence the drive member 118, is increased with respect to the shaft 92 by engaging in a manner described hereinafter an appropriate one of the gears 93 to 97 in the signaling unit with said shaft 92. Such engagement will increase the speed of the sleeve 119 relative to the speed of the engine connected sleeve 126, assuming that the output connected shaft 92 remains at a substantially constant speed, as will normally be the case in a road vehicle or other operation to which this shifting apparatus is adapted. Thus, the engine speed, and consequently the speed of the engine connected sleeve 126, must be increased in order to align the blocking mechanism 133 and complete the shift in the signaling unit.

Since the gear 131 will thus be rotating more slowly than the splined member 118 at the completion of the engagement of the appropriate one of the signaling unit gears 93 to 97, the blocking rings or members 167 and 174 will drag behind the splined member 118 and will take positions with respect to said member 118 as shown in Figure 8. Thus, the slider 119 will be blocked in its rightward movement by the first blocker member 174, whereby the yoke 121 will assume the broken line position 121a. In such position of the yoke 121 and core 122, the orifice 309 will be aligned with the groove 332 and line 247, thereby permitting actuation of the clutch relay 226. When the engine speed increases to such a point that the speed of said blocker member 174 goes past the speed of the splined member 118, the sleeve 119 will become unblocked and will then move rightwardly along said blocker member 174. However, because the blocker ring 174 is being urged by its gear 132 at a faster rate than the blocker ring 167 is by its gear 131, the blocker ring 174 will come into unblocking relationship with the drive member 118 while the blocker ring 167 is still in its unblocking, Figure 8, position where it is aligned with the drive member 118. Thus, once the sleeve moves onto the blocker ring 174, it will continue onto, and along, the blocker ring 167 until the yoke 121 causes the core rod 122 to engage the end plate 143. Thus, in a downshift, the sleeve 119 will move upon passing synchronization to a position where it effects a connection from the pressure line 222 through the valve 123 to the line 242, thereby exhausting the neutral cylinder. However, since the piston head 323 is engaged with the trip core 304 while the orifice 309 passes the groove 333, no pressure will be supplied to the countershaft brake deactuating line 248.

Neutral to first gear

To move the transmission from neutral (Figure 1) into first gear, and with the vehicle at a standstill, there is a different condition presented than when moving from one gear ratio to another while the vehicle is in motion. This difference is met by the presence of the hand trip valve 372 (Figure 1).

To effect the shift from neutral into first gear, the selector lever 361 (Figure 9) is moved into its first position which acts through the control wire 359 to rotate the core 63 of the valve 61 and thereby connect the pressure line 223 to the first gear cylinder outlet port 71 and the pressure line 203 to the signaling unit control port 81. This immediately applies pressure through the port 81 and the lin 204 to the first gear cylinder 108 in the signalling unit 91 and after operation of the pulse control 364, it applies pressure fluid from line 223 through the port 71 and the line 210 to the first gear shift cylinder 44.

Upon actuation of the pulse control 364 on the lever 361 (Figure 10) a pulse of air enters the lines 254, 367, and 368, thereby moving the cores of the valves 226 and 234 rightwardly. Thus, pressure fluid from the supply line 201 passes through the lines 216 and 249, the valve 234 and the lines 252 and 253 to enter the neutral cylinder 57. This pressure fluid in line 249 also passes through the line 251, the clutch valve 226 and the line 230 to the clutch operating cylinder 32, whereby the clutch becomes disengaged. Pressure thus appearing in the neutral cylinder 57 returns the neutral cylinder to the position shown in Figure 10 and thereby opens the neutral valve 58. This causes pressure fluid to flow from the supply line 201 (a) into line 203 and through valve 61 into line 210, as above described, and (b) through the line 222 into the leftward end of the signal valve 123, which urges the rod 122 rightwardly and moves the yoke 121 as far rightwardly as is permitted by the blocking system 133. As shown in Figures 6 and 10, the valve 123 will now connect line 222 with line 248 to brake cylinder 28 for actuating countershaft brake 27, thereby stopping the transmission gearing. However, since the output shaft 8, hence the first signaling shaft 92, is at a standstill, there is little or no possibly that the valve 123 will be moved fully rightwardly in the usual manner by the synchronization of the parts in the speed sensitive mechanism 133 because said parts must actually go past true synchronous speeds to unblock. Therefore, in starting the apparatus, from a standstill, it will not be possible to pressurize the line 244 by and through the line 242 and the valve 123. Accordingly, this function is accomplished by the driver by manually engaging the knob 374 and thereby moving the core 373 rightwardly (Figure 11). This effects a pressurizing of the neutral relay line 244 and thereby pressurizes the rightward side of said neutral relay 234. This condition is shown in Figure 11.

As shown in Figure 11, the neutral cylinder 57 now exhausts through the neutral cylinder valve 234 and the clutch cylinder 29 is also permitted to exhaust through the relay valves 226. However, due to the one-direction restrictor 376 in the line 251, the clutch cylinder 29 will be effectively exhausted only after an appreciable period of time following the exhausting of the neutral cylinder 57.

Upon the effective exhausting of the neutral cylinder 57, the pressure which is already in the first shift cylinder 44 will now be able to move the shift rod 33 rightwardly and effect an engagement of the gear 13 with the gear 24 and thereby place the transmission in its first gear position.

Movement of the shift rod 33 rightwardly will move the plate 50 rightwardly and thereby move the core 60 of the neutral valve 58 also rightwardly to occupy the position shown in Figure 11. This depressurizes the lines 218 and 223, but the check valve 224 prevents depressurization of line 210. Thus, if the shift of rod 333 is not fully completed before the line 223 is connected to exhaust, the residual pressure fluid in said line 210, and particularly in the first ratio cylinder 44 will be adequate to complete the shift. Thus, the shift will take place quickly, as required, but the fluid pressure is cut off as quickly as possible thereby minimizing the load on the pressure source.

As the vehicle starts to move and the rotation of the transmission output shaft 8 brings the speed of the first signaling unit shaft 92 up to the speed normal to a first gear position, the blocking or speed sensitive mechanism 133 will assume the position shown in Figure 7 for an upshift. The speed ratios in moving from neutral to first gear are the same relative to each other as in a conventional upshift from one shifted position to another shifted position, and the blockers will eventually become aligned in a manner which, if there were pressure in the line 222, would permit the sleeve 119 to move into its full rightward position as a result of the synchronizing of the upshift blocker 167 with the splined member 118. However, the line 222 has been depressurized by the closing of the neutral valve 58, as above mentioned and hence there is no movement of the valve 123 and the parts remain in the position shown in Figure 11. Thus, even if synchronization of the blocking mechanism 133 does occur, there is no subsequent pressurizing of any of the output lines 242, 247 or 248 from the valve 123 and hence no subsequent interference with the completed shift.

Shift from first to second

At the beginning of the shift from first to second gear, the apparatus is in the position shown in Figure 11. The selector lever 361 is then moved into second position, as shown in Figure 12. This conducts pressure fluid appearing at the port 80 from the line 203 through the line 205 to the second ratio signaling unit cylinder 109 and moves the yoke 102 rightwardly to connect the gear 96 to the shaft 92. This changes the relative speed of the sleeve 119 with respect to the gears 131 and 132 and thereby brings into operation the blocker system 133, which controls the rightward movement of said sleeve 119.

When the shift is to be actually effected, the knob 364 is raised to provide a pulse of pressure fluid in the pulse line 254. This pushes the cores of both of the relay valves 226 and 234 into their rightward positions, as shown in Figure 12. The movement of the neutral relay valve 234 to its rightward position again admits pressure fluid from the neutral valve pressure line 249 through the neutral valve relay 234 and through the lines 252 and 253 into the neutral cylinder 57. Simultaneously pressure is conducted from the line 252 through the line 251 the clutch relay valve 226 and the clutch line 230 into the clutch cylinder 29, whereby the clutch 3 is released. This permits an immediate movement of the rod 33 leftwardly into its neutral position in response to the urging of the neutral cylinder 57 and the restoration of the transmission gears to the neutral condition. The leftward movement of the plate 50 restores the core 60 of the neutral valve 58 to its open position, as shown in Figure 12, and permits pressure fluid to flow from the line 216 into the line 218 and thence through the line 223 and check valve 224 to the outlet port 72. The pressure at the outlet port 72 is conducted through the line 211 to the second gear shift cylinder 45 thereby placing it under pressure. However, the diameter of the neutral cylinder is greater than the diameter of the shift cylinder and, both being subjected to the same pressure, the neutral cylinder dominates and the transmission remains in neutral position.

The pressurizing of a selected part of the signaling unit previously to the pressurizing of the shift cylinder 45, which cylinder is pressurized in an upshift from first to second gear, results in placing the signaling unit in upshift signaling condition as set forth in more detail hereinafter. Pressure from the line 218 travels through the line 222 to the valve 123 and urges the core 303 thereof rightwardly which results in a rightward urging of the yoke 121 and the sleeve 119.

Engagement of the gear 96 with respect to the shaft 92 slows the shaft 112 with respect to the gears 131 and 132. The resulting more rapid rotation of gears 131 and 132 with respect to splined member 118 tends to urge both of the blocker rings 167 and 174 ahead of the splined member 118 and causes said blocker rings to assume the positions shown in Figure 7 with respect to the splined member 118. Thus, the sleeve 119 can slide along the upshift blocker member 174 until it is stopped by the downshift blocker member 167. During this movement of the sleeve 119, the yoke 121 (Figure 6) will move the rod 122, hence the trip core 304, rightwardly into a position where the orifice 309 is aligned with the groove 333 and line 248. The orifice 309 will move past the groove 332 connected to the line 247 without permitting pressure fluid to pass between the piston head 323 and the trip core 304. Thus, the line 248 and the actuating cylinder 28 are pressurized, whereby the countershaft brake 27 rapidly retards the countershaft, and consequently the transmission gearing, to such a point that synchronization is quickly effected.

The gear 131 rotates slightly slower than the sleeve 126 and input shaft 4, to which it is connected. Accordingly, the blocker ring 167 will reach synchronization with the splined member 118 slightly before the input shaft 4 reaches the synchronization with the output shaft 8. In other words, the blocker member 167 permits rightward movement of the sleeve 119 a predeterminable increment of time before the second ratio gears of the transmission reach their actual synhcronization. Thus, as more fully set forth in the above mentioned application Serial No. 569,503, the point of synchronization in the main transmission is anticipated by a period of time sufficient to initiate mechanical actuating of the parts involved. Thus, by the time the toothed elements to be interengaged actually engage each other, they will be at, or extremely close to, the point of exact synchronization and, further, their relative speeds will be moving toward actual synchronization rather than away therefrom.

Further rightward movement of the sleeve 119 in response to pressure applied from the line 222 to the leftward end of the piston head 323, and as permitted by release of the blocker 167, depressurizes the line 248 and pressurizes the line 242. Pressurizing the line 242 results in the pressurizing of the line 246 up to the check valve 371 which prevents the escape of such pressure through the neutral port 82. Pressurizing the line 242 also pressurizes the line 244 and moves the core of the neutral cylinder valve 234 leftwardly. This depressurizes, in the manner above outlined in detail, both the neutral cylinder 57 and the clutch cylinder 29, the clutch cylinder becoming depressurized more slowly because of the restrictor 376. Upon the depressurizing of the neutral cylinder 57, the pressure in the second ratio cylinder 45 is no longer opposed and moves the shift rod 34 rightwardly and thereby moves the second ratio gear 12 into engagement with the second ratio countershaft gear 23, thereby placing the transmission in its second gear position (Figure 13), with the clutch reengaging immediately thereafter. The spring 120 now returns the rod 122 and core 303 to their full leftward positions of Figure 1.

Shifts from second to and including fifth

The remainder of the sequence of shifting positions from second to and including fifth position proceeds in a manner corresponding to the above outlined shift from first to second. In each case the selector lever 361 is placed in the position corresponding to the desired shift ratio, which results in a proper positioning of the core 63 in the valve 61 for pressurizing the proper cylinders in the signaling unit 91 and in the transmission 1. After such preselection, the driver needs only to actuate the pulse control 364 for effecting the shift. Excepting for the different specific gears and pressure cylinders involved, the sequence of each upshift will be the same as above described for the shift from first to second and needs no further detailing. It should be noted, however, that in each case the mechanism proceeds automatically after the driver actuates the pulse control 364 and nothing he can do will change the sequence of operations. Particularly, in each case, the blocking mechanism 133 responds to the actual change in relative speeds from the shift position originally occupied to the new shift position at a given time. By determining the speed ratios between shafts 92 and 112 in response to the energization of a given shift cylinder, the control signals and synchronizing signals are correct for the shift actually being made regardless of the movements of any of the external controls, such as the selector lever, in upshift or downshift directions prior to the actuation of the pulse control 364.

Shift from second to first

Excepting for the particular gears and pressure cylinders concerned, each downshift operation from one shifted position to another follows the same sequence of operations and hence a downshift may be adequately illustrated by detailing the downshift from second to first gear position and it will be understood that this is illustrative of each of the other downshift operation. Starting with the transmission in its normal second gear position, as illustrated in Figure 13, the downshift is initiated by moving the selector lever 361 into the first gear position, as shown in Figure 14. This applies pressure fluid through line 203 to the first signal control port 81 which directs the pressure fluid through line 204 to the first signal cylinder 108 to effect connection of the gear 97 to the shaft 92. However, the neutral valve 58 is still closed from the last shift (Figure 13) so that no pressure is applied either to the signal valve 123 through the line 222 or to any of the shift rod cylinders through the ports 71 to 75 through the line 223. Thus, the apparatus remains in this condition until the pulse control 364 is raised (Figure 14) and a pulse of pressure fluid admitted into the pulse line 254. When this occurs, the cores of the clutch relay valve 226 and the neutral relay valve 234 are moved rightwardly into the positions shown in Figure 14. Pressure fluid is admitted from the line 249 through the neutral relay valve 234 to the line 252 and the neutral cylinder 57. Simultaneously, pressure fluid is admitted from the line 252 through the clutch valve 226 and the clutch line 230 into the clutch cylinder 29 and releases the clutch. This permits a return of the transmission to neutral position.

Return of the transmission to neutral position opens the neutral valve 58 and thereby pressurizes the line 218 with the resulting pressurizing of both the lines 222 and 223. The valve 61 directs pressure fluid from line 223 to the first gear shift cylinder 44, and line 222 places pressure on the valve 123 for urging the core thereof rightwardly.

Because the gear 97, rather than the gear 96, is now connected to the shaft 92, the shaft 112 is caused to rotate more rapidly than the sleeve 126 and the gears 131 and 132 driven thereby. Thus, the splined member 118 and parts by which the blockers are driven take positions opposite to those shown in Figure 4 and the tooth alignments thereof appear as shown in Figure 8. Under the urging of the pressure fluid from the line 222, the sleeve 119 moves rightwardly until it is stopped by the downshift blocker 174 to occupy the position shown in Figure 15. The yoke 121 (Figure 6), being connected to the sleeve 119, moves into its broken line position 121a, whereby the orifice 309 is connected with the groove 332 and line 247. Accordingly, pressure fluid from line 222 causes the trip core 304 to compress the spring 318 so that pressure fluid from 222 can pass between the piston head 323 and the trip core 304 into the central opening 307. Such pressure fluid then enters the line 247 and the rightward end of the clutch valve 226, thereby moving the core of said valve leftwardly into the position shown in Figure 15. The line 230 thereby exhausts through the valve 226, which permits reengagement of the clutch whereby, as the engine speed is increased by the operator, the speed of the transmission input shaft 4 is similarly increased and this increases the speed of the sleeve 126 in the signaling unit.

The rotational speed of the gear 132, being slightly faster than that of the gear 131, causes first the downshift blocker 174 to pass synchronism with the splined member 118 and move into an unblocking condition before the blocker 167 can attain and pass similar synchronism in order to move out of its unblocking position (Figure 8). Thus, when unblocking of blocker 174 occurs, both blockers will be unblocked and the sleeve 119 will move along and through both the downshift blocker 174 and the upshift blocker 167 until it is stopped by engagement of the core rod 122 with the end plate 143 (Figure 6). This connects the line 222 to the line 242 which pressurizes line 242 and, in the manner above described, moves the core of the neutral relay valve 234 leftwardly to exhaust the neutral cylinder 57. Exhausting the neutral cylinder removes the force opposing the pressure within the first gear shift cylinder 44 and the shift rod 33 is thereby moved rightwardly and the low gear 13 caused to engage the countershaft gear 24. (It will be noted that as the core 303 moves rightwardly the orifice 309 is momentarily in register with groove 333 and the line 248. However, since the movement of the core is not now stopped by the downshift blocker 167 it will move past the groove 333 too rapidly to effect pressurizing of the line 248).

Inasmuch as the gear 132 (Figure 3) is rotating slightly faster than the sleeve 126, which is connected to the input shaft 4, the drive member 118 will become synchronized with the upshift blocker 174 slightly ahead of the point of actual synchronization between the gears 13 and 24. The time lapse between these two synchronizations will be substantially equal to the time required to actuate the several parts which cause the gears 13 and 24 to come into actual, or substantially actual, engagement with each other so that the shift will be completed smoothly, silently and rapidly. The clutch relay 226 having already permitted depressurizing of the clutch cylinder 29, the clutch 3 remains engaged and the shift is completed, the parts having thus returned to the position shown in Figure 11.

*First gear to neutral*

Returning of the transmission from first gear, or any other of the shifted positions thereof, to neutral position is accomplished by moving the selector lever 361 into the appropriate neutral position and thereby moving the core of the valve 61 so that the port 82 is pressurized but none of the ports connected to the signal unit 91 are pressurized. This restores the apparatus to the neutral condition above described and illustrated in Figure 9. The steps by which this is accomplished will be obvious in view of the above description and hence this operation needs no further detailing.

*Neutral to reverse*

The selector lever 361 is moved into the reverse position and the passageway 349 in core 63 of the valve 61 is thereby placed into communication with the reverse cylinder port 76. However, since there is no reverse control port, none of the signaling unit control ports are pressurized. However, there is no neutral signal control port in the valve 61 to which the passageway 347 can be connected. Operation of the pulse control 364 opens the relay valves 234 and 226, whereby the clutch 3 is disengaged and the neutral cylinder 57 is pressurized in a manner described above. Thus, the transmission is neutralized and the neutral valve 58 is operated to pressurize the line 222 and 223. This pressurizes the reverse shift cylinder 43, but the pressure on the neutral cylinder through the neutral valve 234 holds the transmission in neutral position. The hand valve 372 is then operated to pressurize the line 244 from the line 222 for moving the core of the neutral relay 234 leftwardly, which results in depressurizing both the neutral cylinder 57 and the clutch cylinder 29. However, as before, because of the restrictor 376 the clutch cylinder 29 will become depressurized a sufficient period of time after the depressurizing of the neutral cylinder 47 to permit the shift of the transmission to be completed before reengagement of the clutch.

Upon the depressurizing of the neutral cylinder, the pressure in the reverse cylinder 43 acts to move the shift rod 33 leftwardly and engage the gear 13 with the reverse gearing 25. The main shaft 8 of the transmission is not rotating at this point, and there will accordingly be no synchronization between such gears 25 and 13. However, it will be recognized that none of the gears are moving with appreciable speed and, accordingly, the shifted position will be entered into without undesirable clashing and with the clutch engaging immediately thereafter. The shift is now completed and the vehicle is capable of moving in a reverse direction.

It will be recognized that in some instances it will be desirable when moving from a standstill into either reverse or first gear position, to actuate the clutch manually (or pedally) and thereby both make it easier to enter into first or reverse positions from neutral and to effect the commencement of motion of the vehicle (or other power output from the output shaft 8) at a time desired by the operation other than immediately following the completion of the interengagement of the toothed members. The provision of conventional manual or pedal clutch control may therefore be desirable and can be carried out without adversely affecting any of the operations above described. Structure for this purpose is disclosed in the patent application Serial No. 592,384, assigned to the assignee of this application.

Although a particular, preferred embodiment of the invention has been disclosed herein for illustrative purposes, it will be understood that variations or modification thereof which lie within the scope of such invention are fully contemplated unless specifically stated to the contrary by the appended claims.

We claim:

1. A device for signaling a condition of relative speeds between first and second relatively rotating parts approaching synchronism and giving an interpretable signal slightly before synchronism is attained regardless of whether the relative speed of the first part is approaching equality with the speed of said second part from a greater or lesser rate of rotation, the apparatus comprising: a signaling member, means responsive to the speeds of said first part and said second part and to the direction of speed change of said first part with respect to said second part for preventing said signaling member from giving a signal until said first and second parts are approaching synchronism; means responsive to a signal from said signaling member for moving said first and second parts into driving relationship with respect to each other.

2. In a transmission having input and output shafts, a device for signaling a condition of relative speeds between first and second relatively rotating, interchangeable, toothed parts approaching synchronism and giving an interpretable signal slightly before synchronism is attained regardless of whether the relative speed of the first part is approaching equality with the speed of said second part from a greater or lesser rate of rotation, the apparatus comprising: a first signaling shaft operatively connected to one of the input and output shafts of said transmission; a second signaling shaft operatively connected to the other of the input and output shafts of said transmission; means maintaining speed relationships between said first and second signaling shafts proportional to the speed relationships between said input and output shafts; speed sensitive means between said first and second signaling shafts movable between three positions and occupying a first position when said first signaling shaft is reducing its speed with respect to said second signaling shaft and occupying a second signaling position when said first signaling shaft is increasing its speed with respect to said second signaling shaft and occupying a third position when said first and second signaling shafts are rotating at speeds proportional to the speeds at which the input and output shafts of the transmission will rotate when said first and second parts are interengaged; a signaling unit responsive to the position of said speed sensitive means for being prevented from giving a signal when said speed sensitive means is in either its first or its second position and for giving a signal when said speed sensitive means is in its third position to cause said first and second parts to be interengaged.

3. The device defined in claim 2 wherein said speed sensitive means comprises first and second adjacently positioned blocker members and said signalling unit includes a movable reference element alignable with said blocker members, said element being out of alignment with respect to said first blocker member when the speed of said first signaling shaft is increasing with respect to the speed of said second signaling shaft and being out of alignment with said second blocker member when the speed of said first signaling shaft is decreasing with respect to the speed of said second signaling shaft and being in alignment and capable of movement when said first and second signaling shafts are rotating at speeds proportional to the speeds at which the input and output shafts of the transmission will rotate when said first and second parts are interengaged.

4. The device defined in claim 2 wherein said speed sensitive means comprises a pair of circular adjacent blocker members mounted on one of said signaling shafts and rotatable with respect thereto; a circular reference element mounted on said one signaling shaft coaxial with and adjacent to one of said blocker members, said one blocker member being out of alignment with said element when the speed of said first signaling shaft is increasing with respect to the speed of said second signaling shaft and the other blocker member being out of alignment with said reference element when the speed of said first signaling shaft is decreasing with respect to the speed of said second signaling shaft, said blocker members becoming aligned with said element when the speeds of said first and second signaling shafts attain synchronism with respect to each other, and wherein said signaling unit is slidably but non-rotatably movable along said reference element and at least said one blocker member when said speeds of said first and second signaling shafts are synchronous, the movement of said signaling unit being limited at a first predetermined point if said one blocker member is out of alignment with said element and said signaling unit being limited in its movement at a second predetermined point if the other blocker member is out of alignment with said element.

5. Apparatus for controlling the shifting of a change gear system having a plurality of pairs of interengageable, toothed elements, comprising in combination: a plurality of selectable force responsive means for applying shifting pressure to a selected pair of interengageable toothed elements to urge them into or out of engagement; a series of independently operable power devices which when energized act through one of said force responsive means to urge said selected pair of said elements into engagement with each other; a neutral device arranged to act through said force responsive means and effective when energized for placing said change gear system in neutral condition, said neutral device when energized simultaneously with a selected one of said power devices being capable of overcoming said power device and holding said change gear system in neutral condition; a signaling unit adapted for signaling a condition of relative speed between elements to be engaged and for effecting a mechanical movement of a signaling member upon the attainment of a preselected condition of such relative speed, said signaling unit distinguishing between an upshift and a downshift sequence by moving said signaling member in one characteristic manner for an upshift and in a second characteristic manner for a downshift; a manually operable selector valve, said valve when moved to one desired position being operable for selecting a selected one of said power devices and simultaneously energizing a selected portion of said signaling unit; a manual initiating device operative when actuated for energizing said neutral device for returning said gear system to neutral position; means responsive to a signal from said signaling unit upon the attainment of a predetermined relative speed between the elements about to be engaged for deenergizing said neutral device and permitting the previously energized power device to operate and effect the selected shift; means responsive to said one characteristic movement of said signaling member for slowing the input side of the gear system when said system is in neutral, said last-named means not being actuated when said signaling member moves in said second characteristic manner; a clutch connected to the input side of said gear system; means for disengaging said clutch upon energizing of said neutral device; and means responsive to a signal from said signaling unit to re-engage said clutch.

6. The device defined in claim 5 wherein said manually operable selector valve includes a pivotally mounted lever and means connecting said lever to the selector valve in such a manner that the pivotal position of said lever determines the position of said valve for supplying energy to selected parts of said signaling unit and said power devices, and said manual initiating device constitutes a manually actuatable member mounted on said lever and independently connected with said neutral device for energizing same.

7. Apparatus for controlling the shifting of a change gear system, comprising in combination: force responsive means for shifting a selected pair of interengageable gears into or out of engagement; a series of independently operable power devices which when energized act through said force responsive means to effect said shifting; a neutral device arranged to act through said force responsive means and effective when energized for placing said change gear system in neutral condition, said neutral device when energized simultaneously with a selected one of said power devices being capable of overcoming said power device and holding said change gear system in neutral condition; a signaling unit adapted for signaling a condition of relative speed between gears to be engaged and for effecting a mechanical movement of a signaling member upon the attainment of a preselected condition of such relative speed; a pair of axially arranged, relatively movable, blocker devices for distinguishing between an upshift and a downshift sequence by controlling axial movement of said signaling member in one characteristic manner for an upshift and in another characteristic manner for a downshift; a manually operable selector valve, said valve when moved to one desired position being operable for selecting a selected one of said power devices and simultaneously energizing a selected portion of said signaling unit; a manual initiating device operative when actuated for energizing said neutral device for returning said gear system to neutral position, means responsive to a signal from said signaling unit upon the attainment of a predetermined relative speed between the gears about to be engaged for deenergizing said neutral device and permitting the previously energized power device to operate and effect the selected shift; means responsive to said one characteristic movement of said signaling member for slowing the input side of the gear system when said system is in neutral, said last-named means not being actuated when said signaling member moves in said second characteristic manner; a clutch connected to the input side of said gear system, means for disengaging said clutch upon energizing of said neutral device; means responsive to a signal from said signaling unit to re-enage said clutch.

8. Apparatus for controlling the shifting of a change gear system, comprising in combination: force responsive means for applying shifting pressure to a selected pair of interengageable gears to urge them into or out of engagement; a series of independently operable power devices which when energized act through one of said force responsive means to urge a selected pair of said gears into engagement with each other; a neutral device arranged to act through said force responsive means and effective when energized for placing said change gear system in neutral condition, said neutral device when energized simultaneously with a selected one of said power devices being capable of overcoming said power device and holding said change gear system in neutral condition; a signaling unit adapted for signaling a condition of relative speed between gears to be engaged and for effecting a mechanical movement of a signaling member upon the attainment of a preselected condition of such relative speed, said signaling unit distinguishing between an upshift and a downshift sequence by moving said signaling member in one characteristic manner for an upshift and in a second characteristic manner for a downshift; a manually operable selector valve, said valve when moved to one desired position being operable for selecting a selected one of said power devices and simultaneously energizing a selected portion of said signaling unit; a clutch in the input of the gear system; a manually operable initiating device operative when actuated for releasing said clutch and for energizing said neutral device for returning said gear system to neutral position; means responsive to a signal from said signaling unit upon the attainment of a predetermined relative speed between the gears about to be engaged for deenergizing said neutral device and permitting the previously energized power device to operate and effect the selected shift; a brake connected to the input side of the change gear system; means responsive to said one manner of moving said signaling member to apply said brake, said last-named means not being actuated when said signaling member moves in said second manner; and means responsive to a signal from said signaling unit for re-engaging said clutch.

9. In a transmission having input and output shafts, a device for signaling a condition of relative speeds between first and second relatively rotating parts approaching synchronism and giving an interpretable signal slightly before synchronism is attained regardless of whether the relative speed of the first part is approaching equality with the speed of said second part from a greater or lesser rate of rotation, the apparatus comprising: a first signaling shaft operatively connected to one of the input and output shafts of said transmission; a second signaling shaft operatively connected to the other of the input and output shafts of said transmission; means maintaining speed relationships between said first and second signaling shafts proportional to the speed relationships between said input and output shafts; speed sensitive means between said first and second signaling shafts, including first and second rotative elements, means driving said first and second rotative elements from said first signaling shaft, said first rotative element being driven at a rate slightly faster than said first signaling shaft and said second rotative element being driven at a rate slightly slower than said first signaling shaft; synchronism indicating means between said second signaling shaft and said rotative elements, whereby, when said first and second signaling shafts are approaching synchronism from such relative speeds that said first signaling shaft is rotating more rapidly than said second signaling shaft, the signaling means will be actuated by the attainment of synchronism between said second signaling shaft and said first rotative element, and, when synchronism is being approached from relative speeds between said first and second signaling shafts such that said first signaling shaft is rotated more slowly than said second signaling shaft, the signaling means will be operated by synchronism between said first signaling shaft and said second rotative element, whereby, in either case, the signaling element is actuated slightly before actual synchronism between said first signaling shaft and said second signaling shaft is attained.

10. A shifting apparatus for a change speed gear transmission, having an input and an output shaft, comprising in combination: a signaling unit connected to the input and output shafts of the transmission for being driven in a predetermined speed ratio with respect thereto, said signaling unit including blocking means and means driving said blocking means from the transmission for placing said blocking means in a first condition when the transmission is being upshifted and for placing said blocking means in a second condition when the transmission is being downshifted; signaling means including a single signal element in the signaling unit operable in response to the condition of said blocking means for giving a signal to shift the gears of the transmission when the gears next to be engaged are approaching synchronism on either an upshift or a downshift of the transmission.

11. A shifting apparatus as defined in claim 10 wherein said blocking means includes a pair of blocking devices; ratio drive means connected to one of the shafts of the transmission for driving said blocking devices at speeds respectively faster than and slower than same would be driven if they were driven at said predetermined speed ratio; means for driving said signaling means from the other shaft of said transmission, said signal element being movable to give a shifting signal, said blocking devices blocking movement of said signal element until its speed becomes about equal to the speed of said blocking devices which occurs when the gears next to be engaged in the transmission are approaching synchronism.

12. A shifting apparatus as defined in claim 11 including a clutch connected to the input shaft of said transmission; means for releasing said clutch when said transmission is in neutral and means responsive to a shifting signal for re-engaging said clutch.

13. A shifting apparatus for a main change speed gear transmission having an input and an output shaft, comprising in combination: a signaling unit including a miniature transmission having gears providing gear ratios corresponding to the gear ratios of the main transmission, said miniature transmission having a pair of rotatable shafts, one of which is driven at a predetermined speed ratio with respect to the corresponding shaft of said main transmission; means for selectively engaging the gears to provide one of said gear ratios in said miniature transmission to thereby rotate the other shaft thereof at said predetermined speed ratio with respect to the speed at which the other shaft of the main transmission will rotate when the corresponding gears thereof are engaged; signaling means driven by said other shaft of said miniature transmission; a pair of blocking devices; a pair of ratio drive means driven at said predetermined speed ratio from said other shaft of said main transmission, said ratio drive means being engaged with the respective blocking devices for concurrently urging the driving of same at speeds respectively faster than and slower than same would be driven if they were driven at said predetermined speed ratio, said blocking devices blocking movement of said signaling means until its speed becomes about equal to the speed of said blocking devices which occurs when the gears next to be engaged in the main transmission are approaching synchronism.

14. A shifting apparatus according to claim 13 wherein the signaling means includes an axially movable sleeve surrounding said other shaft of said miniature transmission and drivingly engaged therewith; and said blocking devices are a pair of adjacent, relatively movable blocking rings around which said sleeve may pass in order to give a signal; interfitting lost motion means on said rings so that same may be moved with respect to each other a limited distance to occupy one relative position with respect to each other on an upshift of the main transmission and to occupy another relative position with respect to each other on a downshift of the main transmission.

15. A shifting apparatus according to claim 14 wherein said one shaft of said miniature transmission has a series of gears rotatably mounted thereon and said other shaft of said miniature transmission has a series of gears fixedly mounted thereon which continuously mesh with the corresponding gears on said one shaft; and means for selectively drivingly connecting said gears on said one shaft to said one shaft.

16. A shifting apparatus for a main transmission having input and output shafts, comprising in combination: a signaling unit including a miniature transmission having gears providing gear ratios corresponding to the gear ratios of the main transmission, said miniature transmission having a pair of shafts; means for driving one of said shafts at a predetermined speed ratio from one of the shafts of said main transmission; a pair of blocking devices associated with said miniature transmission and a pair of ratio drive means driven from the other shaft of the main transmission at said predetermined speed ratio and engaged with said blocking devices, respectively, for concurrently urging the driving of said blocking devices faster than and slower than same would be driven if they were driven at said predetermined speed ratio so that said blocking devices are placed in a first condition when said main transmission is being upshifted and are placed in a second condition when the main transmission is being downshifted; fluid pressure operated shift rods for shifting the gears of said main transmission; movable signaling means driven from the other shaft of said miniature transmission, said other shaft being driven from said one shaft of said miniature transmission through selected gears thereof so that said other shaft will be rotated at said predetermined speed ratio with respect to the speed at which the other shaft of said main transmission will rotate when the next gear set to be engaged therein is engaged, said blocking means blocking movement of said signaling means until its speed becomes about equal to the speed of said blocking devices which occurs when the gears next to be engaged in the main transmission are approaching synchronism; a signaling valve for supplying fluid pressure to shift the shift rod for the next gear set to be engaged and a valve actuator carried by said signaling means and operated by a predetermined movement thereof for shifting said valve to thereby cause shifting of the shift rod for the next gear set to be engaged.

17. A shifting apparatus according to claim 16 including a clutch connected to the input shaft of said main transmission; a brake connected for decelerating the input shaft of said main transmission; means operable by movement of said shift rods into neutral position for disengaging said clutch; said blocking devices when in said first condition permitting a limited amount of movement of said signaling means into an intermediate position; means operated upon movement of said signaling means into its intermediate position for applying said brake; said blocking devices when in said second condition not permitting said signaling means to occupy said intermediate position so that said brake is applied only on an upshift of said main transmission.

18. A shifting apparatus according to claim 16 including fluid pressure operated shift rods connected for selectively drivingly engaging the gears of said miniature transmission to provide the gear ratios therein corresponding to the gear ratios in the main transmission; a manually operable selector valve connected for supplying fluid pressure to operate one of said shift rods for said miniature transmission at a time and to precondition the shifting apparatus so that upon said predetermined movement of said signaling means and shifting of said signaling valve fluid pressure will be supplied to operate the corresponding shift rod of said main transmission.

19. A shifting apparatus for a change speed gear transmission having an input and an output shaft comprising in combination: a signaling unit connected to the input and output shafts of the transmission for being driven in a predetermined speed ratio with respect thereto; said signaling unit including blocking means and means driving said blocking means from said transmission for placing said blocking means in a first condition when the transmssion is being upshifted and for placing said blocking means in a second condition when the transmission is being downshifted; fluid pressure operated shift rods connected for selectively shifting the gears of said transmission; a fluid pressure operated piston and cylinder arrangement connected to said shift rods for moving said shift rods into neutral when fluid pressure is supplied to said arrangement; a signaling valve operable, when actuated, to cause fluid pressure to be applied to a selected shift rod to cause shifting of said transmission; a single movable valve actuator in said signaling unit responsive to operation of said blocking means for actuating said valve when the gears of the transmission which are next to be engaged are approaching synchronism on either an upshift or a downshift of the transmission; and a selector valve for selecting the gears next to be engaged.

20. A shifting apparatus for a change-speed gear transmission having an input shaft and an output shaft, comprising in combination: a signaling unit connected to the input and output shafts of the transmission for being driven in a predetermined speed ratio with respect thereto, said signaling unit including speed responsive signaling means for giving a shifting signal when the gears of the transmission which are next to be engaged are approaching synchronization; fluid pressure operated shift rods connected for selectively shifting the gears of said transmission; a fluid pressure operated piston and cylinder arrangement connected to said shift rods for moving said shift rods into neutral when fluid pressure is applied to said arrangement; a signaling valve operable, when actuated, to cause fluid pressure to be supplied to a selected shift rod to cause shifting of said transmission; movable valve actuator means in said signaling unit responsive to a signal from said speed responsive signaling means for actuating said valve when the gears of the transmission which are next to be engaged are approaching synchronism on either an upshift or a downshift of the transmission; a selector valve for selecting the gears next to be engaged; a neutral valve connected in series between a pressure source and said selector valve for controlling supply of fluid pressure to said selector valve; means operable by movement of said shift rods into neutral position for placing said neutral valve in its fluid pressure conducting position so that fluid pressure is supplied through said selector valve to shift a shift rod only after all the shift rods are in neutral position.

21. A shifting apparatus as set forth in claim 20 including neutral cylinder valve means for controlling supply of fluid pressure to said piston and cylinder arrangement; manually operable means for shifting said neutral cylinder valve means to a position where fluid pressure is supplied to said arrangement to thereby move the shift rods to neutral at the commencement of a shifting operation; and means operable by movement of said valve actuator for shifting said neutral cylinder valve means to block supply of fluid pressure to said arrangement whereby the shifting operation may be completed.

22. A power transmitting apparatus, comprising: a main change speed gear transmission having an input shaft, an output shaft and a plurality of alternately selectable gear sets for providing a plurality of speed ratios between said shafts; a fluid pressure source; a plurality of fluid pressure operated shift rods connected to said gear sets for selectively engaging same to provide said speed ratios; a piston and cylinder arrangement connected to said shift rods for moving same into neutral position when fluid pressure is supplied to said arrangement; a neutral valve connected to said pressure source and means for placing said neutral valve in fluid pressure conducting position when said arrangement is pressurized; a miniature transmission having a pair of shafts with constantly meshed sets of gears thereon corresponding to the gear sets of said main transmission, the gears on one of said shafts being rotatable with respect thereto and the gears on the other shaft being fixed thereto for rotation therewith; means for selectively drivingly connecting the gears on said one miniature transmission shaft thereto and fluid pressure operated shift rods for operating said last-named means; an axially movable, internally toothed sleeve surrounding and drivingly engaged with said other miniature transmission shaft; a pair of externally toothed blocker members mounted on said other shaft for rotation with respect thereto and arranged in series thereon; interfitting lost motion means between said blocker members for positioning the teeth thereon in one of two relative circumferential positions with respect to each other; a gear secured to each of said blocking members, said gears having different numbers of teeth thereon; a third shaft having two gears thereon meshing, respectively, with said gears on said blocker members for driving same at different speeds with respect to said third shaft; means drivingly connecting said one shaft of said miniature transmission to said output shaft and means drivingly connecting said third shaft to said input shaft so that said one shaft and said third shaft rotate at a predetermined speed ratio with respect to the output and input shafts; a signaling valve and a valve actuator connected to said sleeve for movement therewith for actuating said valve; a manually operable selector valve having a first series of ports continuously connected to the pressure source and connected respectively for operating said shift rods of said miniature transmission, said selector valve having a second set of ports connected through said neutral valve to said pressure source and also connected for operating said shift rods of said main transmission after said neutral valve is placed in fluid pressure conducting position; a neutral cylinder relay valve for controlling supply of fluid pressure to said arrangement; manually operable means for placing said relay valve in position for conducting fluid pressure to said arrangement whereby the shift rods of said main transmission are placed in neutral; means connected to said signaling valve for shifting said relay valve to relieve pressure on said arrangement when said signaling valve is actuated.

23. A power transmitting apparatus according to claim 22 including a fluid pressure operated clutch connected to the input shaft of said main transmission; a clutch relay valve connected in series with said neutral cylinder relay valve for supplying fluid pressure to disengage said clutch a predetermined time after said arrangement is pressurized; a fluid pressure operated brake connected for retarding the speed of said input shaft; said blocking members including means holding said valve actuator in an intermediate position during an upshift of said main transmission; and a port in said signaling valve for supplying fluid pressure to apply the brake when said valve actuator is in its intermediate position.

24. A shifting apparatus for a change speed gear transmission, having an input and an output shaft, comprising in combination: a signaling unit connected to the input and output shafts of the transmission for being driven in a predetermined speed ratio with respect thereto, said signaling unit including blocking means and means driving said blocking means from one shaft of the transmission for placing said blocking means in first condition when the transmission is being upshifted and for placing said blocking means in a second condition when the transmission is being downshifted; signaling means in the signaling unit including means driven from the other shaft of the transmission and operated by said blocking means for giving a signal to shift the gears of the transmission when the gears next to be engaged are approaching synchronism on either an upshift or a downshift of the transmission.

References Cited in the file of this patent

UNITED STATES PATENTS

| | | |
|---|---|---|
| 1,198,000 | Beemer | Sept. 12, 1916 |
| 1,903,635 | Saives | Apr. 11, 1933 |
| 2,459,363 | Chamberlain | Jan. 18, 1949 |